United States Patent
Fakoorian et al.

(10) Patent No.: US 11,743,872 B2
(45) Date of Patent: Aug. 29, 2023

(54) UPLINK DATA CHANNEL DESIGN FOR NARROWBAND DEVICES

(71) Applicant: QUALCOMM Incorporated, San Diego, CA (US)

(72) Inventors: Seyed Ali Akbar Fakoorian, San Diego, CA (US); Alberto Rico Alvarino, San Diego, CA (US); Peter Gaal, San Diego, CA (US); Wanshi Chen, San Diego, CA (US); Yongbin Wei, La Jolla, CA (US); Juan Montojo, San Diego, CA (US); Renqiu Wang, San Diego, CA (US); Hao Xu, Beijing (CN); Xiaofeng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/392,230

(22) Filed: Aug. 2, 2021

(65) Prior Publication Data

US 2021/0385812 A1    Dec. 9, 2021

Related U.S. Application Data

(60) Continuation of application No. 16/369,308, filed on Mar. 29, 2019, now Pat. No. 11,115,977, which is a
(Continued)

(51) Int. Cl.
*H04W 72/0446* (2023.01)
*H04L 5/00* (2006.01)
*H04L 27/20* (2006.01)

(52) U.S. Cl.
CPC ....... *H04W 72/0446* (2013.01); *H04L 5/0046* (2013.01); *H04L 5/0048* (2013.01); *H04L 27/2078* (2013.01)

(58) Field of Classification Search
CPC ............ H04W 72/0446; H04L 5/0046; H04L 5/0048; H04L 27/0278
See application file for complete search history.

(56) References Cited

U.S. PATENT DOCUMENTS 6,404,761 B1   6/2002   Snelling et al.
7,280,467 B2   10/2007   Smee et al.
(Continued)

FOREIGN PATENT DOCUMENTS

CN   102387101 A   3/2012
CN   102412880 A   4/2012
(Continued)

OTHER PUBLICATIONS

3GPP TR 45.820: "3rd Generation Partnership Project; Technical Specification Group GSM/EDGE Radio Access Network; Cellular System Support for Ultra Low Complexity and Low Throughput Internet of Things (Release 13)", V1.3.1 (Jun. 2015), Sec. 7.3.3.1, pp. 1-271, 2015.
(Continued)

*Primary Examiner* — Duc C Ho
(74) *Attorney, Agent, or Firm* — Patterson & Sheridan, LLP

(57) ABSTRACT

Aspects of the present disclosure provide techniques for uplink (UL) data channel design. An example method is provided for operations which may be performed by a first apparatus. The example method generally comprises determining a number of pilot symbols to transmit for one or more slots of a first subframe based, at least in part, on a coverage enhancement (CE) level, and transmitting at least one uplink data channel having the determined number of pilot symbols in the one or more slots of the first subframe.

18 Claims, 19 Drawing Sheets

Related U.S. Application Data division of application No. 15/371,885, filed on Dec. 7, 2016, now Pat. No. 10,285,174.

(60) Provisional application No. 62/296,568, filed on Feb. 17, 2016, provisional application No. 62/280,686, filed on Jan. 19, 2016, provisional application No. 62/277,471, filed on Jan. 11, 2016.

(56) References Cited

U.S. PATENT DOCUMENTS

| | | | |
|---|---|---|---|
| 8,737,502 | B2 | 5/2014 | Luo et al. |
| 10,285,174 | B2 | 5/2019 | Fakoorian et al. |
| 2003/0123525 | A1 | 7/2003 | Smee et al. |
| 2008/0232240 | A1* | 9/2008 | Baum .................. H04W 88/00 370/210 |
| 2009/0163153 | A1 | 6/2009 | Senda et al. |
| 2010/0103920 | A1 | 4/2010 | Damnjanovic et al. |
| 2010/0188252 | A1 | 7/2010 | Numai |
| 2010/0189093 | A1* | 7/2010 | Palanki .................. H04B 17/345 370/344 |
| 2011/0141918 | A1 | 6/2011 | Li |
| 2012/0113941 | A1 | 5/2012 | Chung et al. |
| 2014/0221038 | A1 | 8/2014 | Nakashima et al. |
| 2014/0226638 | A1 | 8/2014 | Xu et al. |
| 2014/0229997 | A1 | 8/2014 | Kim et al. |
| 2014/0241242 | A1 | 8/2014 | Josiam et al. |
| 2015/0078300 | A1 | 3/2015 | Xu et al. |
| 2015/0085723 | A1 | 3/2015 | Chen et al. |
| 2015/0085797 | A1 | 3/2015 | Ji et al. |
| 2015/0098418 | A1 | 4/2015 | Vajapeyam et al. |
| 2016/0056934 | A1 | 2/2016 | Li et al. |
| 2016/0226639 | A1 | 8/2016 | Xiong et al. |
| 2017/0041948 | A1* | 2/2017 | Cheng .................. H04L 5/0051 |
| 2017/0201989 | A1 | 7/2017 | Fakoorian et al. |
| 2018/0056934 | A1 | 3/2018 | Schramm |
| 2019/0239220 | A1 | 8/2019 | Fakoorian et al. |

FOREIGN PATENT DOCUMENTS

| | | |
|---|---|---|
| CN | 104640211 A | 5/2015 |
| CN | 107977789 A | 5/2018 |
| WO | 2004064295 A2 | 7/2004 |
| WO | 2010091423 A2 | 8/2010 |
| WO | 2014127101 A2 | 8/2014 |
| WO | 2014161630 A1 | 10/2014 |

OTHER PUBLICATIONS

"3rd Generation Partnership Project; Technical Specification Group GSM/EDGE Radio Access Network; Cellular system support for ultra-low complexity and low throughput Internet of Things (CIoT) (Release 13)," 3GPP Standard; 3GPP TR 45.820, 3rd Generation Partnership Project (3GPP), Mobile Competence Centre ; 650, Route Des Lucioles ; F-06921 Sophia-Antipolis Cedex ; France, vol. GERAN WG1, No. V13.1.0, Dec. 18, 2015 (Dec. 18, 2015), pp. 1-495, XP051047128, [retrieved on Dec. 18, 2015] p. 328-p. 335.
Huawei, et al., "Further Discussion on Coverage Improvement for the Data Channels" [online], 3GPP TSG-RAN WG1#74, R1-133513, URL: http://www.3gpp.org/ftp/tsg_ran/WG1_RL1/TSGR1_74/Docs/R1-133513.zip, Barcelona , Spain, Aug. 23, 2013, 3 Pages.
Huawei et al., "NB-PUSCH Design," 3GPP Draft, 3GPP TSG RAN WG1 Meeting #84, R1-160325, 3rd Generation Partnership Project (3GPP), Mobile Competence Centre ; 650, Route Des Lucioles ; F-06921 Sophia-Antipolis Cedex ; France vol. RAN WG1, No. St Julian's, Malta; Feb. 15, 2016-Feb. 19, 2016 Feb. 14, 2016 (Feb. 14, 2016), XP051053665, Retrieved from the Internet: URL:http://www.3gpp.org/ftp/Meetings 3GPP_SYNC/RAN1/Docs/ - - [retrieved on Feb. 14, 2016] pp. 1-3,5.
International Preliminary Report on Patentability—PCT/US2016/065661, The International Bureau of WIPO—Geneva, Switzerland, dated Jul. 26, 2018.
International Search Report and Written Opinion—PCT/US2016/065661—ISA/EPO—dated Jun. 6, 2017.
LG Electronics: "Overview on Design of Uplink for NB-IoT", 3GPP Draft, 3GPP TSG RAN WG1 Meeting #82-bis, R1-155801, UL Overview, 3rd Generation Partnership Project (3gpp), Mobile Competence Centre, 650, Route Des-Lucioles, F-06921 Sophia-Antipolis Cedex, France, vol. RAN WG1, No. Malmo, Sweden, May 10, 2015-Sep. 18, 2015, Oct. 4, 2015, XP051002604, 5 pages. Retrieved from the Internet: URL:http://www.3gpp.org/ftp/Meetings_3GPPSYNC/RAN1/Docs/.
Mediatek Inc: "NB-IoT Uplink Consideration", 3GPP TSG RAN WG1 Meeting 83, R1-156974, NB-IoT Uplink Consideration, 3rd Generation Partnership Project (3gpp), Mobile Competence Centre, 650, Route Des Lucioles, F-06921, Sophia-Antipolis Cedex, France, vol. RAN WG1, No. Anaheim, USA, Nov. 15, 2015-Nov. 22, 2015, Nov. 24, 2015, XP051022842, 5 pages. Retrieved from the Internet: URL:http://www.3gpp.org/ftp/tsg_ran/WG1_RL1/TSGR1_83/Docs/, Table 3; Section 3.
Partial International Search Report and Written Opinion—PCT/US2016/065661—ISA/EPO—dated Mar. 20, 2017.
Qualcomm Incorporated: "UL Data Channel Design", 3GPP Draft, 3GPP TSG-RAN WG1 NB-IoT, R1-160107 Uplink Data Channel Design, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 18, 2016-Jan. 20, 2016, Jan. 12, 2016, XP051064720, Retrieved from the Internet: URL:http://www.3gpp.org/ftp/tsg_ran/WG1_RL1/TSGR1_AH/LTE_NB-IoT_1601/Docs/[retrieved on Jan. 12, 2016], 5 pages.
Qualcomm Incorporated: "UL Data Channel Design" [online], 3GPP TSG-RAN WG1#82, R1-160880, URL: http://www.3gpp.org/ftp/tsg_ran/WG1_RL1/TSGR1_84/Docs/R1-160880.zip, Feb. 19, 2016, St Julian's, Malta, 8 Pages.
Taiwan Search Report—TW105140584—TIPO—dated May 7, 2020.
Taiwan Search Report—TW109129860—TIPO—dated May 5, 2021.
Ericsson: "NB-IoT-NB-PUSCH Design" [online], 3GPP Draft, 3GPP TSG-RAN1 NB-IOT Ad Hoc, R1-160085, Budapest, Hungary, Jan. 18-20, 2016, 7 Pages, Retrieved from the Internet: URL: https://www.3gpp.org/ftp/TSG_RAN/WG1_RL1/TSGR1_AH/LTE_NB-IoT_1601/Docs/R1-160085.zip.
LG Electronics: "Discussions on PUSCH Design for NB-IoT" [online], 3GPP Draft, 3GPP TSG RAN WG1 Meeting NB-IoT Ad-Hoc, R1-160122, Budapest, Hungary, Jan. 18-20, 2016, pp. 1-6, Retrieved from the Internet URL: http://www.3gpp.org/ftp/tsg_ran/WG1_RL1/TSGR1_AH/LTE_NB-IoT_1601/Docs/R1-160085.zip.

* cited by examiner

1500A

Symbol N     Symbol N

1500B

Symbol N+1 (rotated pi/4 with respect to the previous one)     Symbol N+1 (rotated pi/4 with respect to the previous one)

1500C

Down-select 2 of the symbols     Down-select 2 of the symbols

1500D

Binary sequence selects
between the two

Binary sequence selects
between the two

UPLINK DATA CHANNEL DESIGN FOR NARROWBAND DEVICES

CLAIM OF PRIORITY UNDER 35 U.S.C. § 120

The present Application for Patent is a continuation of U.S. application Ser. No. 16/369,308, filed Mar. 29, 2019, issued as U.S. Pat. No. 11,115,977 on Sep. 7, 2021, which is a divisional of U.S. Pat. No. 10,285,174, issued May 7, 2019, (filed on Dec. 7, 2016), which claims benefit of U.S. Provisional Patent Application Ser. No. 62/296,568, filed Feb. 17, 2016, U.S. Provisional Patent Application Ser. No. 62/280,686, filed Jan. 19, 2016, and U.S. Provisional Patent Application Ser. No. 62/277,471, filed Jan. 11, 2016, all of which are assigned to the assignee hereof and hereby expressly incorporated by reference herein in their entirety.

BACKGROUND

Field of the Disclosure

Certain aspects of the present disclosure generally relate to wireless communications and, more particularly, to uplink data channel design for narrowband devices.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may communicate with a base station, another remote device, or some other entity. MTC UEs may include UEs that are capable of MTC communications with MTC servers and/or other MTC devices through Public Land Mobile Networks (PLMN), for example.

Wireless devices may communicate using relative narrowband regions of system bandwidth, such as narrowband internet of things (NB-IoT) devices. Certain NB-IoT devices may be considered MTC devices. To reduce the complexity of UEs, NB-IoT may allow for deployments utilizing a reduced bandwidth, as compared to for example, a wideband LTE channel. A new frame structure may be used for such devices allowing for increased compatibility along with greater capacity.

SUMMARY

Certain aspects of the present disclosure provide a method for wireless communications by a first apparatus. The method generally includes determining a number of pilot symbols to transmit for one or more slots of a first subframe based, at least in part, on a coverage enhancement (CE) level, and transmitting at least one uplink data channel having the determined number of pilot symbols in the one or more slots of the first subframe.

Certain aspects of the present disclosure provides a first apparatus for wireless communications. The first apparatus generally includes at least one processor configured to determine a number of pilot symbols to transmit for one or more slots of a first subframe based, at least in part, on a coverage enhancement (CE) level, and a transmitter for configured to transmit at least one uplink data channel having the determined number of pilot symbols in the one or more slots of the first subframe.

Certain aspects of the present disclosure provide a first apparatus for wireless communications. The first apparatus generally includes means for determining a number of pilot symbols to transmit for one or more slots of a first subframe based, at least in part, on a coverage enhancement (CE) level, and means for transmitting at least one uplink data channel having the determined number of pilot symbols in the one or more slots of the first subframe.

Certain aspects of the present disclosure provide a computer program product for wireless communications by a first apparatus. The computer program product comprises a computer-readable medium comprising code, which when executed by at least one processor, causes the at least one processor to determine a number of pilot symbols to transmit for one or more slots of a first subframe based, at least in part, on a coverage enhancement (CE) level, and transmit at least one uplink data channel having the determined number of pilot symbols in the one or more slots of the first subframe.

Certain aspects of the present disclosure provide a method for wireless communications by a user equipment (UE). The method generally includes determining a first modulation scheme, determining a second modulation scheme, determining a first set of resources for data transmission and a second set of resources for pilot transmission, and transmitting at least one uplink data channel over the first and second set of resources, wherein the first set of resources use the first modulation scheme and the second set of resources use the second modulation scheme.

Numerous other aspects are provided including methods, apparatus, systems, computer program products, computer-readable medium, and processing systems.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Example Wireless Communication System

Figure 1:
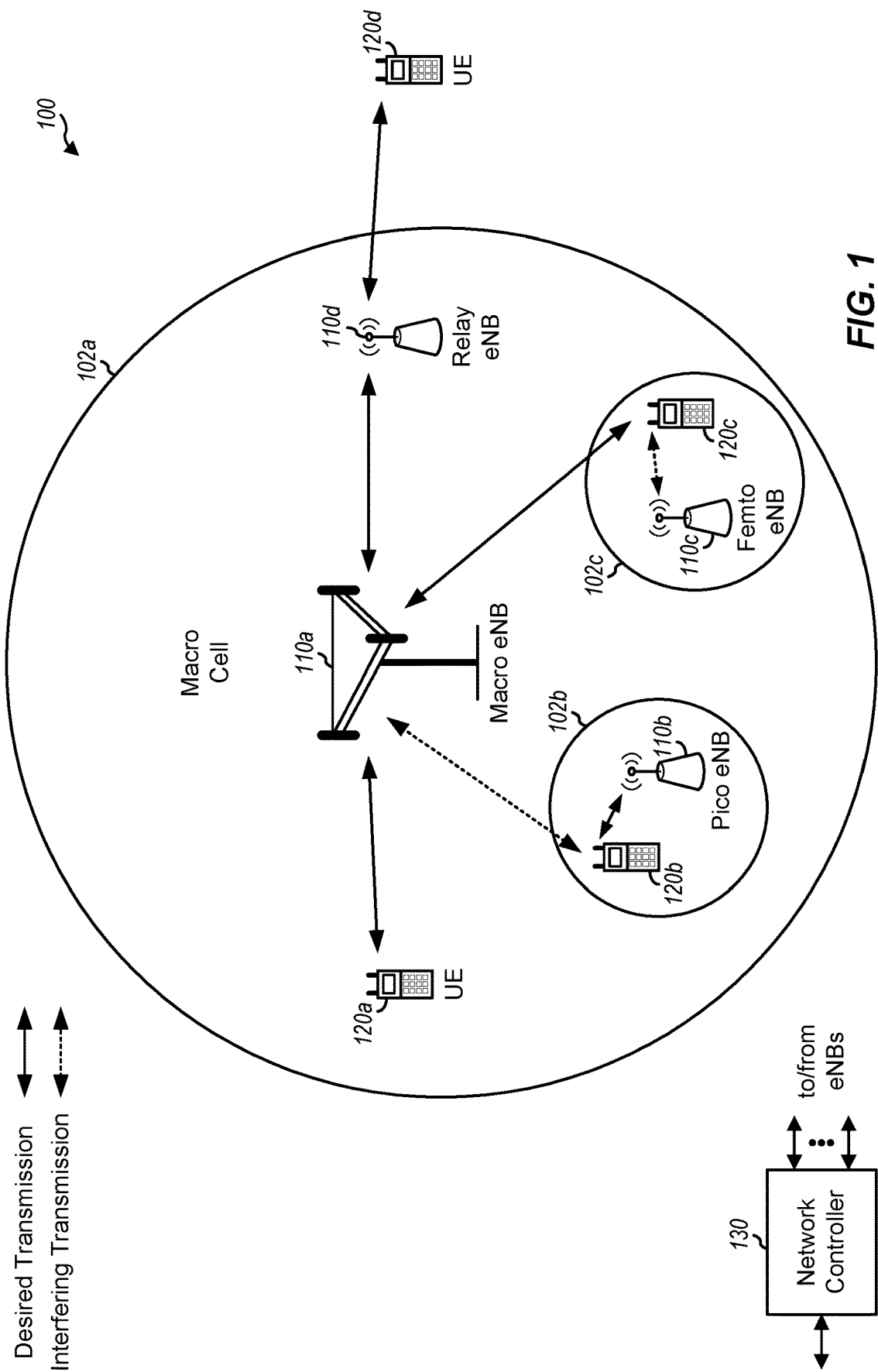
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., one-PRB, six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used. Some examples of UEs may include cellular phones, smart phones, personal digital assistants (PDAs), wireless modems, handheld devices, tablets, laptop computers, netbooks, smartbooks, ultrabooks, wearable devices (e.g., smart glasses, smart bracelets, smart wrist bands, smart rings, smart watches, smart clothing), drones, robotic devices, entertainment devices, gaming devices, vehicular devices, medical/healthcare devices, etc. Some UEs may be considered machine-type communication (MTC) UEs, which may include remote devices, such as sensors, meters, monitors, location tags, drones, robotic devices, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs and other types of UEs may be implemented as NB-IoT devices An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, by monitoring for wideband control channels in the first few symbols (e.g., physical downlink control channel (PDCCH)) as well as narrowband control channels occupying a relatively narrowband, but spanning a length of a subframe (e.g., enhanced or evolved PDCCH (ePDCCH)).

According to certain aspects, narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
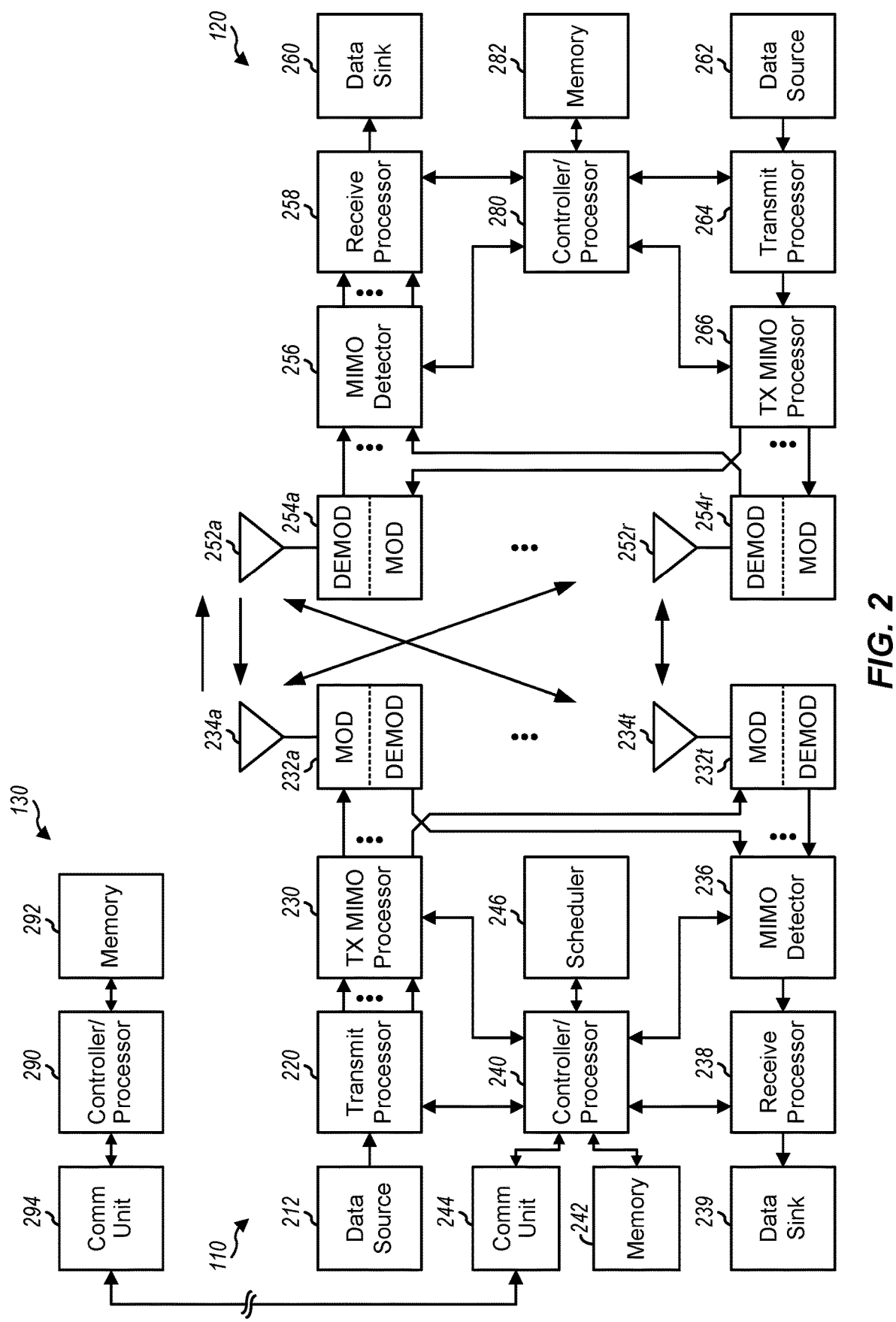
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 280 and/or other processors and modules at UE 120 may perform or direct operations 500 shown in FIG. 5, and processor 240 and/or other processors and modules at base station 110 may perform or direct operations at base station 110. Memories 242 and 282 may store data and program codes for base station 110 and UE 120, respectively. A scheduler 246 may schedule UEs for data transmission on the downlink and/or uplink.

Figure 3:
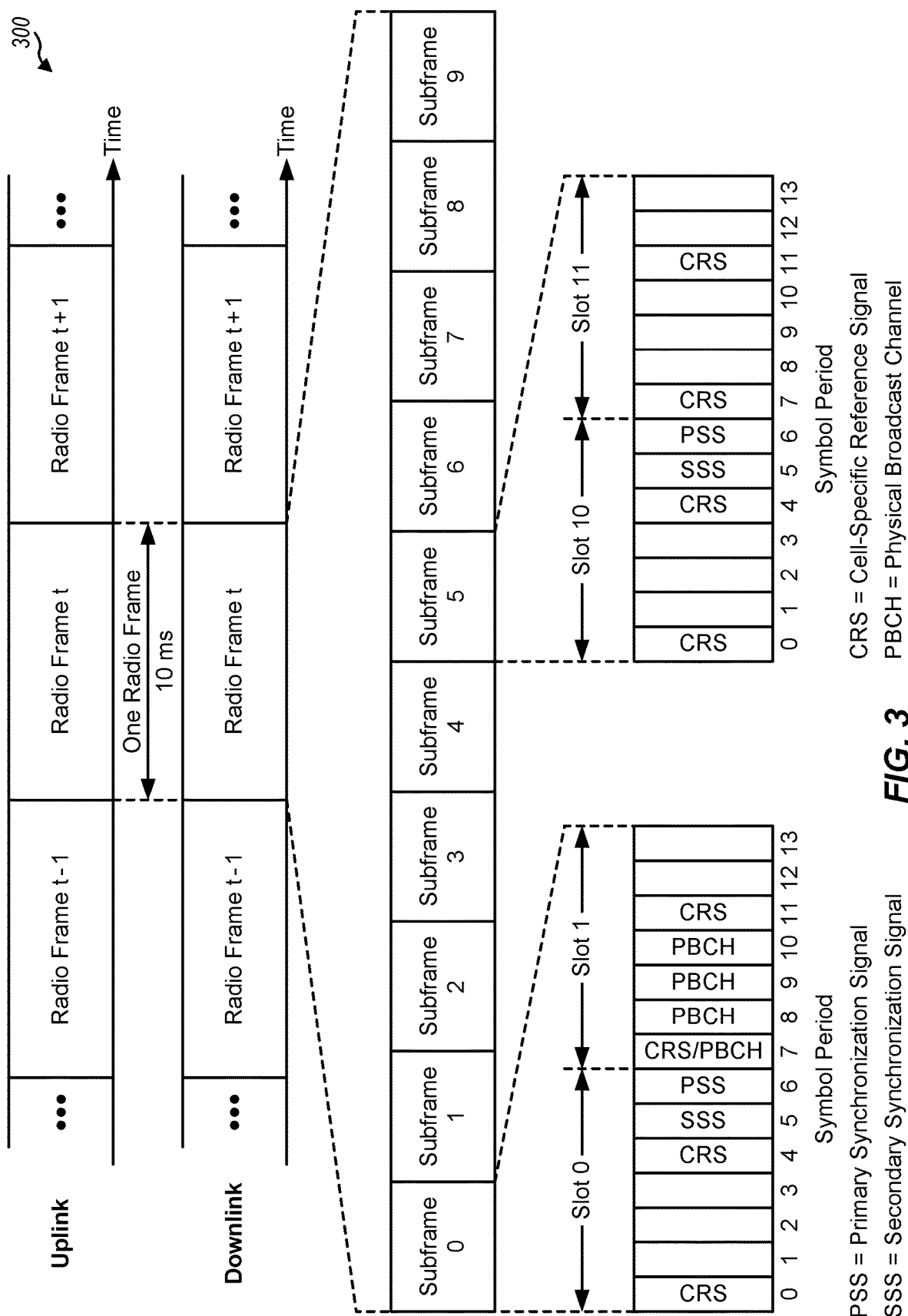
FIG. 3 shows an exemplary frame structure for frequency division duplexing (FDD) in long term evolution (LTE).

FIG. 3 shows an exemplary frame structure 300 for FDD (frequency division duplex) in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, an eNB may transmit a cell specific reference signal (CRS) on specific subframes. For example, an eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may be also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
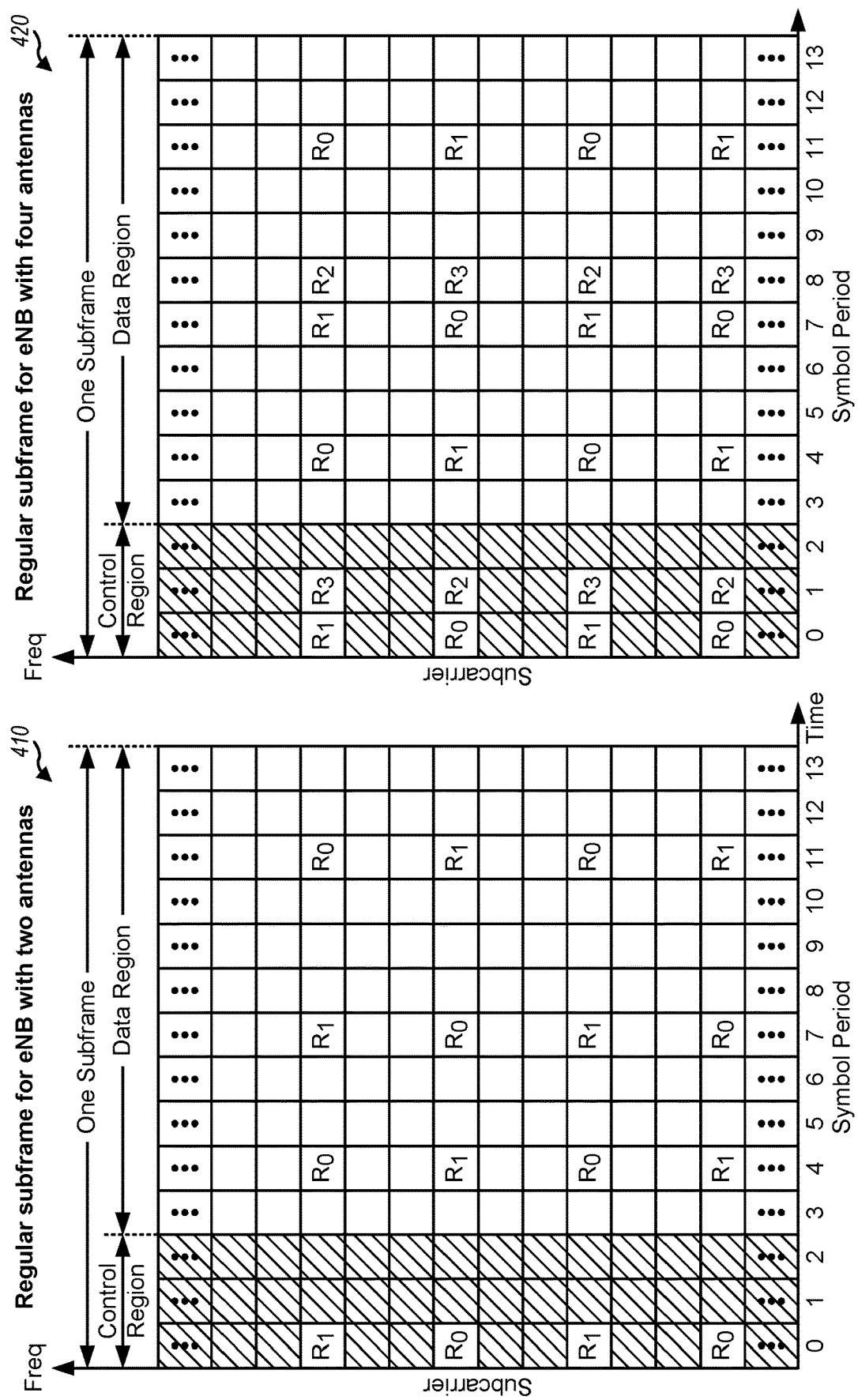
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where q $\in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

A UE may be configured to transmit a sounding reference signal (SRS) to one or more eNBs. This STS may be used by an eNB to estimate uplink channel quality over a bandwidth and used for uplink frequency selective scheduling. The SRS transmission may stretch over a relatively large frequency range in order to provide broad feedback over an entire bandwidth. To avoid collisions between an SRS transmitted by a first UE and an UL transmission of another UE, other UEs may avoid transmitting in the OFDM symbols in which SRS transmissions may occur. To achieve this, all UE within a cell may be aware of the set of subframes within which SRS may be transmitted by other UEs within the cell. The other UEs may then avoid UL transmissions during those subframes.

Narrowband Operations

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones, tablets, or other wideband device, which may support a relatively large DL and UL link budget.

As described above, one or more UEs in the wireless communication network (e.g., wireless communication network 100) may be devices that have limited communication resources, such as narrowband UEs, as compared to other (wideband) devices in the wireless communication network. Narrowband devices may be relatively simple, low powered devices, and various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operations may be performed.

In some cases, if half-duplex operations are performed, narrowband UEs may have a relaxed switching time to transition from transmitting to receiving (or receiving to transmitting). For example, the switching time may be relaxed from 20 μs for regular UEs to 1 ms for narrowband UEs. Release 12 narrowband UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the narrowband may be limited to a particular narrowband assignment (e.g., of no more than six resource blocks (RBs)) within the available system bandwidth. However, the narrowband may be able to re-tune (e.g., operate and/or camp) to different narrowband regions within the available system bandwidth of the LTE system, for example, in order to co-exist within the LTE system.

As another example of coexistence within the LTE system, narrowband UEs may be able to receive (with repetition) legacy physical broadcast channel (PBCH) (e.g., the LTE physical channel that, in general, carries parameters that may be used for initial access to the cell, such as the MIB) and support one or more legacy physical random access channel (PRACH) formats. For example, the narrowband UEs may be able to receive the legacy PBCH with one or more additional repetitions of the PBCH across multiple subframes. As another example, the narrowband UEs may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to the narrowband UE) based on its link budget limitation. For example, in some cases, the narrowband UE may operate in a normal coverage mode in which there is little to no repetition. In such cases, the amount of repetition needed for the UE to successfully receive a message may be low or repetition may not even be needed. Alternatively, in some cases, the narrowband UE may operate in a coverage enhancement (CE) mode in which there may be high amounts of repetition. For example, for a 328 bit payload, a narrowband UE in CE mode may need 150 or more repetitions of the payload in order to successfully receive the payload.

In some cases, for example, for LTE Rel-13, the narrowband UE may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

Narrowband UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-narrowband UEs. For example, as compared to conventional paging messages used in LTE, narrowband UEs may able to monitor and/or receive paging messages that non-narrowband UEs may not able to monitor and/or receive. Similarly, as compared to conventional random access response (RAR) messages used in a conventional random access procedure, narrowband UEs may be able to receive RAR messages that also may not be able to be received by non-narrowband UEs. The new paging and RAR messages associated with narrowband UEs may also be repeated one or more times (e.g., "bundled"). In addition, different numbers of repetitions (e.g., different bundling sizes) for the new messages may be supported. These various bundling sized may be used to determine a CE level. For example, CE levels may be determined in part from the bundle size used for various channels where larger bundling sizes are associated with larger CE levels.

According to certain aspects, multiple narrowband regions, each narrowband region spanning a bandwidth that is no greater than a total of 6 RBs, may be supported by narrowband UE and/or narrowband operation. In some cases, each narrowband UE in narrowband operation may operate within one narrowband region (e.g., at 1.4 MHz or 6 RBs) at a time. However, narrowband UEs in narrowband operation, at any given time, may re-tune to other narrowband regions in the wider system bandwidth. In some examples, multiple narrowband UEs may be served by the same narrowband region. In other examples, multiple narrowband UEs may be served by different narrowband regions (e.g., with each narrowband region spanning 6 RBs). In yet other examples, different combinations of narrowband UEs may be served by one or more same narrowband regions and/or one or more different narrowband regions.

Some systems, for example, in LTE Rel-13, introduce coverage enhancements and support for narrowband UEs, as well as other UEs. As used herein, the term coverage enhancement generally refers to any type of mechanism that extends the coverage range of a device (such as a narrowband device) within a network. One approach for coverage enhancement (CE) is bundling which refers to transmitting the same data multiple times (e.g., across multiple subframes or, as will be described in greater detail below, across multiple symbols within a same subframe).

Certain systems may provide narrowband UEs with coverage enhancements of up to 15 dB, which maps to 155.7 dB maximum coupling loss between the UE and an eNB. Accordingly, narrowband UEs and eNB may perform measurements at low SNRs (e.g., −15 dB to −20 dB). In some systems, coverage enhancements may include channel bundling, wherein messages associated with narrowband UEs may be repeated (e.g., bundled) one or more times.

Certain devices may be able to communicate both with legacy type communications and non-legacy type communications. For example, some devices may be able to communicating in both narrowband regions (of overall system bandwidth) as well as wider band regions. While the examples above refer to low cost or MTC devices that communicate via narrowband regions, other (non-low-cost/non-MTC) types of devices may also communicate via narrowband regions, for example, taking advantage of frequency selectivity and directional transmissions.

Devices, such as narrowband interne of things (NB-IoT) devices may communicate using relative narrowband regions of system bandwidth, as compared to wideband LTE. Additionally, wideband LTE may utilize subcarriers which are spaced 15 kHz apart from each other. NB-IoT devices, may also support a 15 kHz subcarrier spacing, for example, on a single tone or multi-tone uplink (UL) data channel. NB-IoT devices may also support a single tone UL data channel with a tone spacing (e.g., UL subcarrier spacing) of 3.75 kHz in addition to a 15 kHz tone spacing.

A 3.75 kHz tone spacing design offers more bandwidth capacity as compared to a 15 kHz tone spacing. This is because 3.75 kHz allows for a time domain to be expanded by a factor of four, as the spacing between subcarriers is reduced. This expansion allows for 4 ms subframes where the slots may be 2 ms in length, rather than 0.5 ms. This increase in bandwidth capacity allows, for example, four UEs to be supported instead of one for a particular frequency domain. However, not all TDD modes may be supported as at least two consecutive uplink subframes are needed for certain TDD modes. Additionally, legacy LTE SRS transmissions may be inefficient when transmitted with 3.75 kHz tone spacing.

A 15 kHz tone spacing design offers compatibility with in-band LTE configurations, but has less capacity as compared to the 3.75 kHz designs due to the larger tone spacing. This relative lack of capacity may be addressed, at least in part, through code division multiplexing (CDM), though handling SRS for multiple UEs operating together using CDM may be an issue.

A frame structure capable of handling both 3.75 kHz and 15 kHz tone spacing may be designed to increase compatibility and capacity, as well as support all TDD modes by fitting into 1 ms slots.

Uplink Data Channel Design

Figure 5:
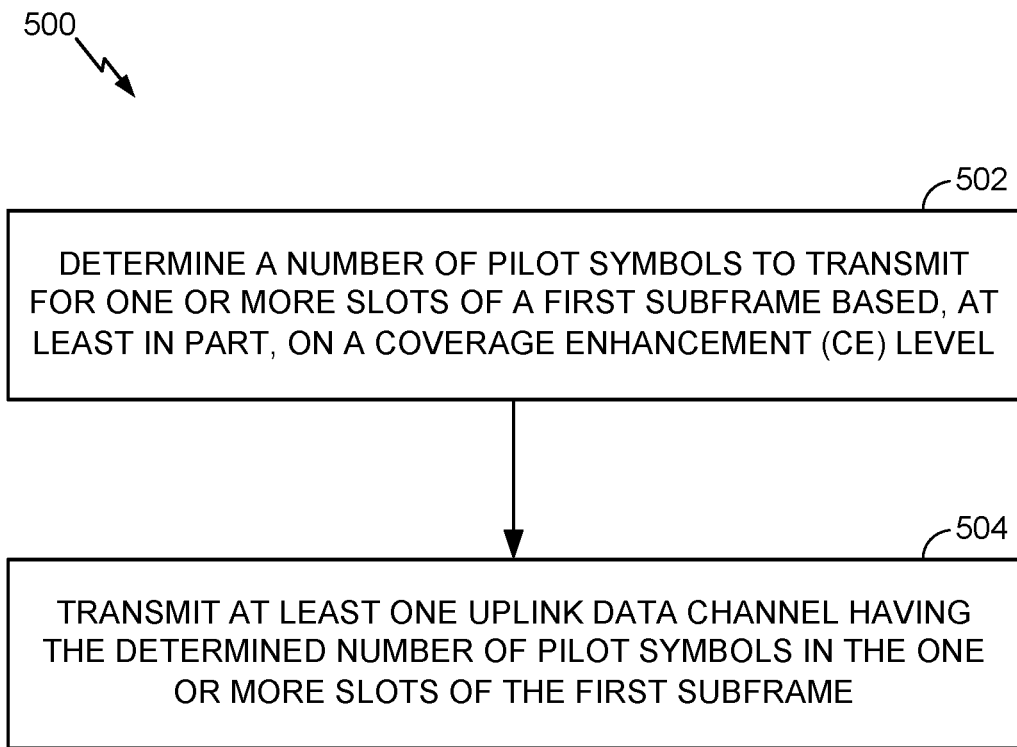
FIG. 5 illustrates an example uplink process that may be performed by a first apparatus, e.g., user equipment (UE), in accordance with aspects of the present disclosure.

FIG. 5 illustrates an example uplink process 500 that may be performed by a first user equipment (UE), in accordance with aspects of the present disclosure. At 502, determine a number of pilot symbols to transmit for one or more slots of a first subframe based, at least in part, on a coverage enhancement (CE) level. At 504, transmit at least one uplink data channel having the determined number of pilot symbols in the one or more slots of the first subframe.

According to certain aspects of the present disclosure, the frame structure for the number of data and pilot symbols within each slot may be based on a coverage class (e.g., enhancement level). For example, the frame structure for UL control channels for UEs with a 15 kHz tone spacing may be similar to a frame structure used for LTE UL data channels (e.g., physical uplink shared channel (PUSCH)), with a single pilot per slot, similar slot and sub-frame durations, cyclic prefix (CP), and data lengths, and number of demodulation reference signal (DMRS) and data symbols within each slot. Where a UE is operating in extended coverage, two DMRS pilots within each slot may be used. Where a UE is operating in extremely extended coverage, three DMRS pilots within each slot may be used.

According to certain aspects of the present disclosure, the number of pilots for each slot may be determined implicitly based on, for example, the coverage enhancement level or other information such as the PUSCH repetition level or MCS. The number of pilots may also be determined based on an explicitly signaled RRC configuration, or UL grant.

Figure 6:
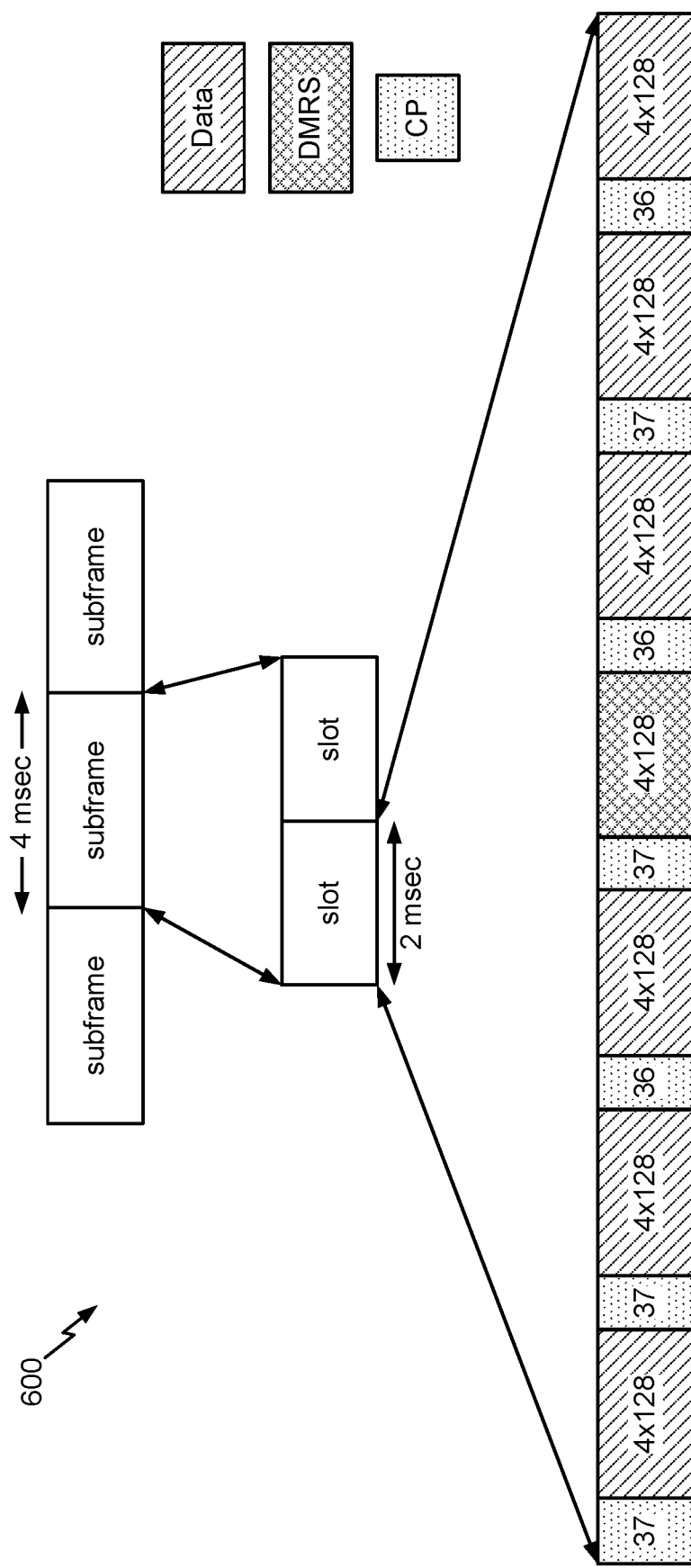
FIG. 6 illustrates an example frame structure 600 utilizing 3.75 kHz tone spacing, according to aspects of the present disclosure.

FIG. 6 illustrates an example frame structure 600 utilizing 3.75 kHz tone spacing, according to aspects of the present disclosure. As the spacing between subcarriers are reduced, units of the radio frame may be expanded by a factor of four, resulting in a larger CP duration, along with larger data and DMRS durations. For example, using a 1.92 MHz sampling rate, a data duration with a 15 kHz tone spacing may be 128, while a data duration with 3.75 kHz tone spacing may be 4×128.

According to certain aspects of the present disclosure, the frame structure for UL control channels for UEs with a 3.75 kHz tone spacing may also be based on coverage class. For example, a UE operating with 3.75 kHz tone spacing may utilize six data symbols and one DMRS within each slot. A UE operating in extended coverage may utilize five data symbols two DMRS within each slot. A UE operating in extremely extended coverage may utilize four data symbols and three DMRS within each slot.

Figure 7:
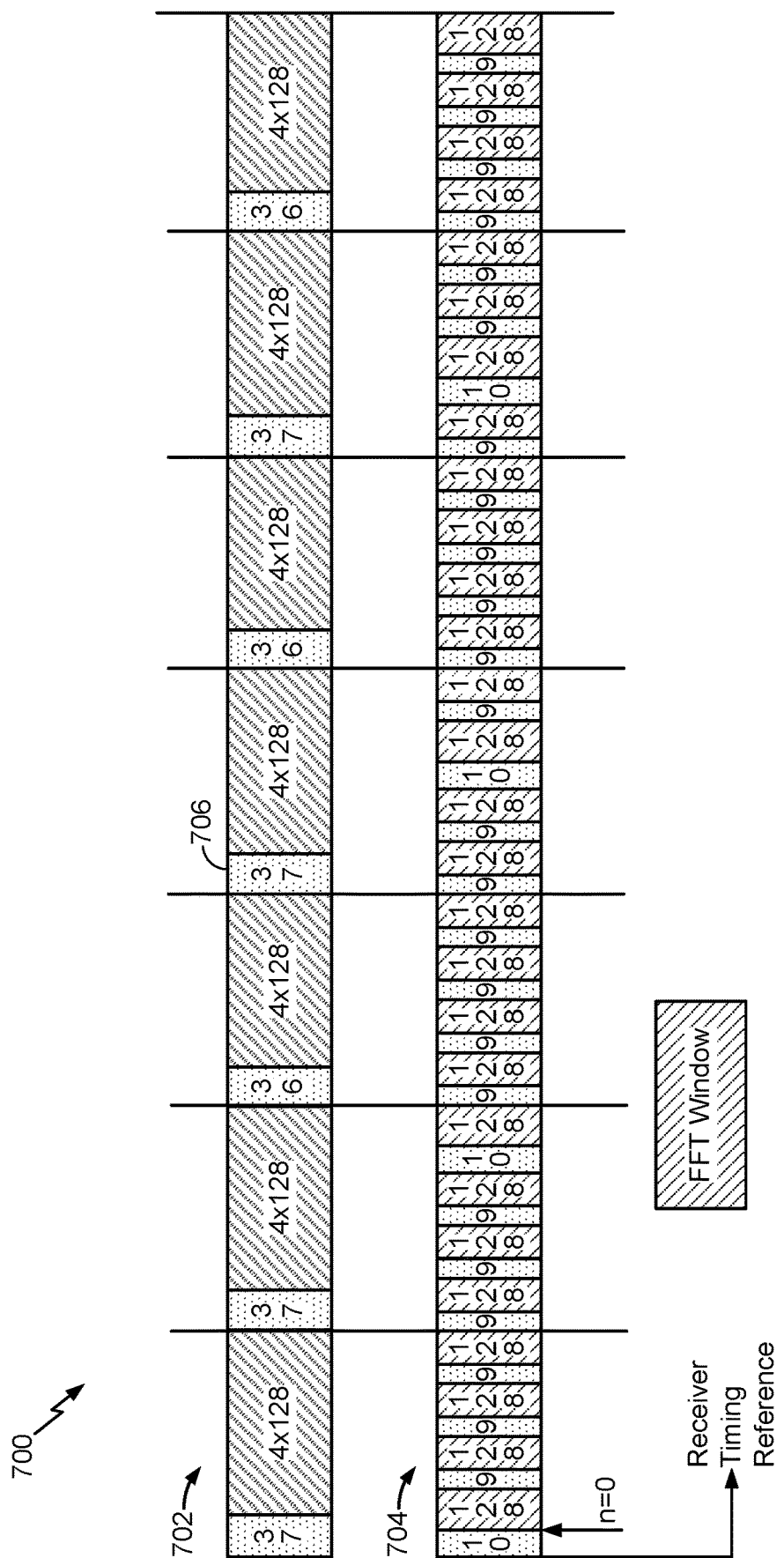
FIG. 7 illustrates an example multiplexed frame structure 700, according to aspects of the present disclosure.

FIG. 7 illustrates an example multiplexed frame structure 700, according to aspects of the present disclosure. A first UE may transmit a 3.75 kHz tone spacing UL signal 702 and a second UE may transmit a 15 kHz tone spacing UL signal 704. As shown, each 3.75 kHz OFDM symbol may be adjusted to be equivalent to four 15 kHz OFDM symbols. CP durations within the 3.75 kHz OFDM symbol is adjusted to match within each 15 kHz FFT block such that within each 15 kHz FFT block, orthogonality is maintained. With the adjusted CP in FIG. 7, any tone ι on the 3.75 kHz grid, for which ι/4 is a whole number (ι/4∈Z), is allowed to remain orthogonal relative to the 15 kHz tone, and allows the symbols between the 3.75 and 15 kHz tones to be aligned within a 2 ms signal length.

Figure 8A:
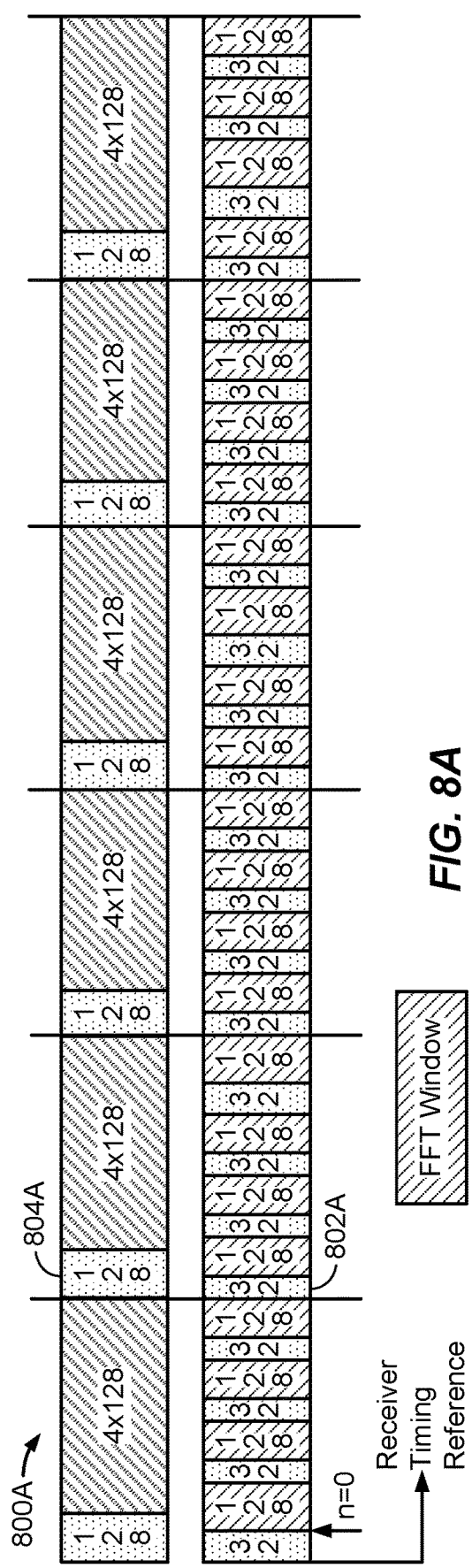
FIGS. 8A-8B illustrate example multiplexed frame structure having extended CPs, according to aspects of the present disclosure.

FIG. 8A illustrates example multiplexed frame structure having an extended CP 800A, according to aspects of the present disclosure. Where an extended CP may be utilized, orthogonality between 15 kHz and 3.75 kHz may be maintained by extending the CP lengths for the 3.75 kHz tones relative to the 15 kHz tones. For example, an extended CP in a subframe using 15 kHz tone spacing 802A may have a length of 32 and the corresponding extended CP in a subframe using 3.75 kHz tone spacing 804A may be 4×32 or 128. Extending the CP for 3.75 kHz may result in 6 OFDM symbols, instead of 7 ODFM symbols within a 2 ms slot.

Figure 8B:
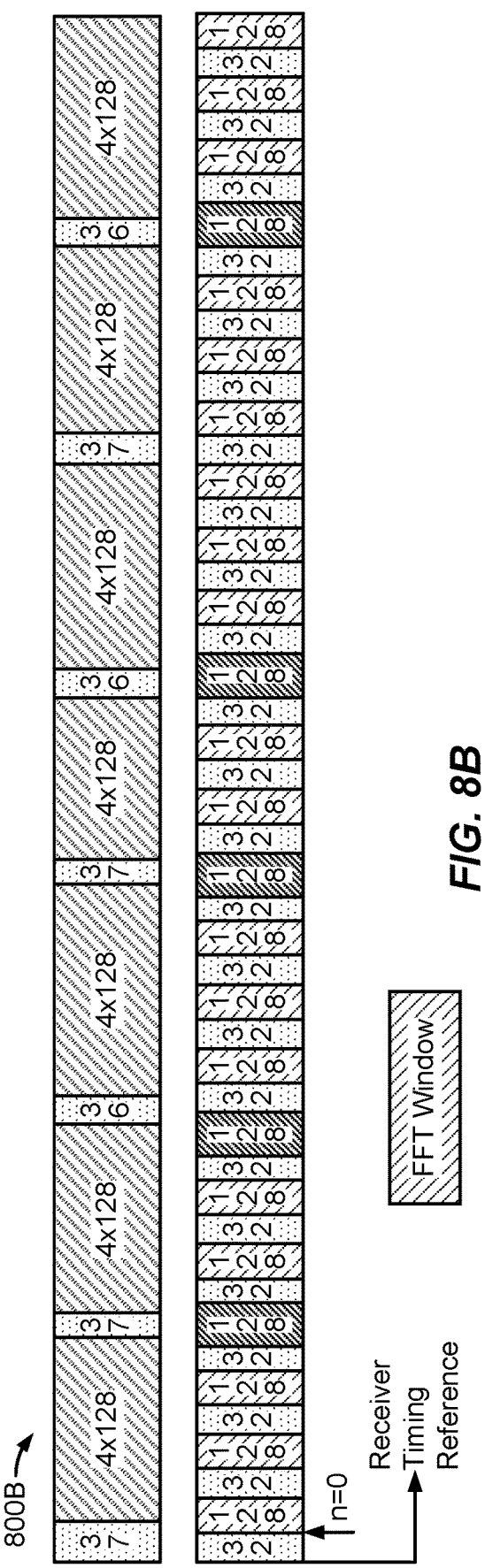

According to other aspects of the present disclosure, multiplexing may be supported for subframes with extended CPs utilizing 15 kHz tone spacing. For example, as shown in FIG. 8B, where extended CPs are utilized with 15 kHz tone spacing along with normal CP formats utilized for 3.75 kHz tone spacing, orthogonality would be lost for five out of 24 15 kHz OFDM symbols. For these OFMD symbols, any tone on a 3.75 kHz grid would interfere with tones on the 15 kHz grid.

Figure 9:
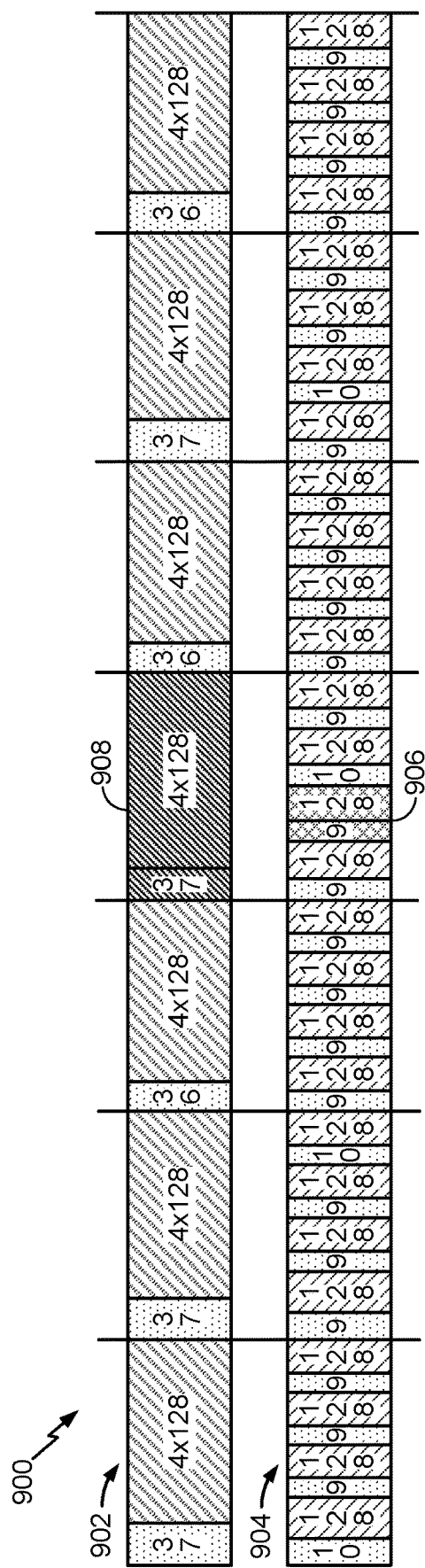
FIGS. 9 and 9A illustrate example multiplexed frame structures with a SRS transmission, according to aspects of the present disclosure.
Figure 9A:
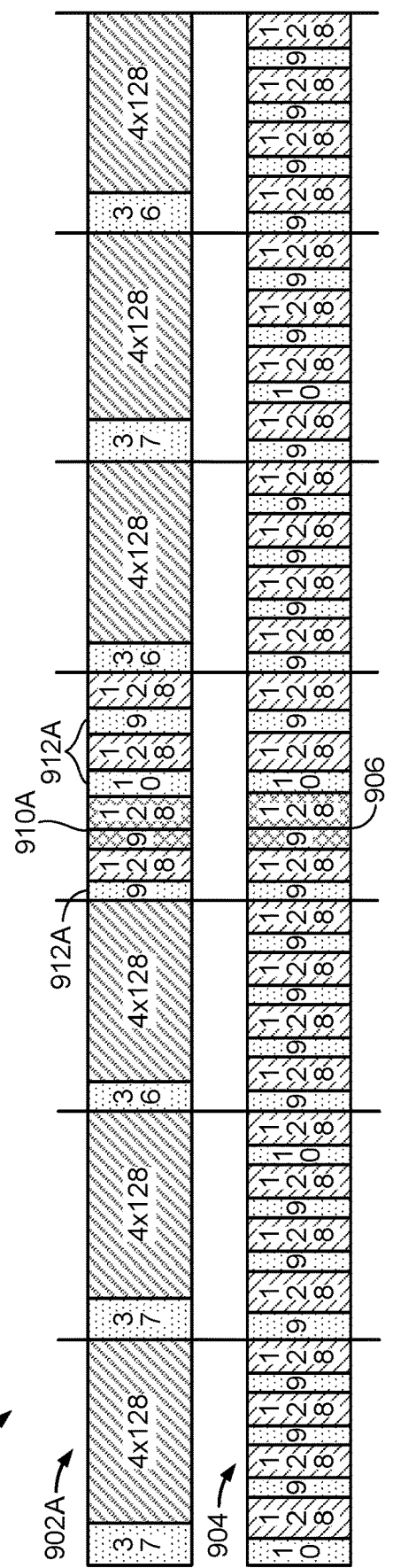

FIGS. 9 and 9A illustrates example multiplexed frame structures with a SRS transmission, according to aspects of the present disclosure. Transmissions from multiple UEs may be received as a multiplexed signal(s) 900 and 900A by, for example, an eNB. The multiplexed signal may include a first UE transmitting using a 3.75 kHz tone spacing UL signal 902 and a second UE transmitting using a 15 kHz tone spacing UL signal 904. Where a SRS transmission 906 is transmitted using 15 kHz tone spacing, the corresponding OFDM symbol 908 of the first UE using 3.75 kHz tone spacing needs to be silenced. This silencing corresponds to, e.g., a 14% loss in bandwidth for 3.75 kHz.

According to aspects of the present disclosure, to reduce the loss of bandwidth from silencing during a 15 kHz SRS transmission, a UE transmitting utilizing a 3.75 kHz tone spacing UL signal 902A may, for the specific OFDM symbol scheduled for SRS, switch to a 15 kHz grid. This would convert a 3.75 kHz symbol into four 15 kHz symbols and allow the UE to only silence a single 15 kHz OFDM symbol 910A corresponding to the SRS transmission 906 and allow three 15 kHz symbols 912A to transmit.

Switching from 3.75 kHz to 15 kHz may introduce issues as the 3.75 kHz tone spacing allows four UEs to transmit instead of a single UE for a particular frequency domain. For example, switching to a 15 kHz grid from a 3.75 kHz grid may require three out of four UEs to be silenced. According to aspects of the present disclosure, CDM (e.g., discrete Fourier transform (DFT) spreading) over time may be applied to allow recovery of three out of four UEs.

Figure 10:
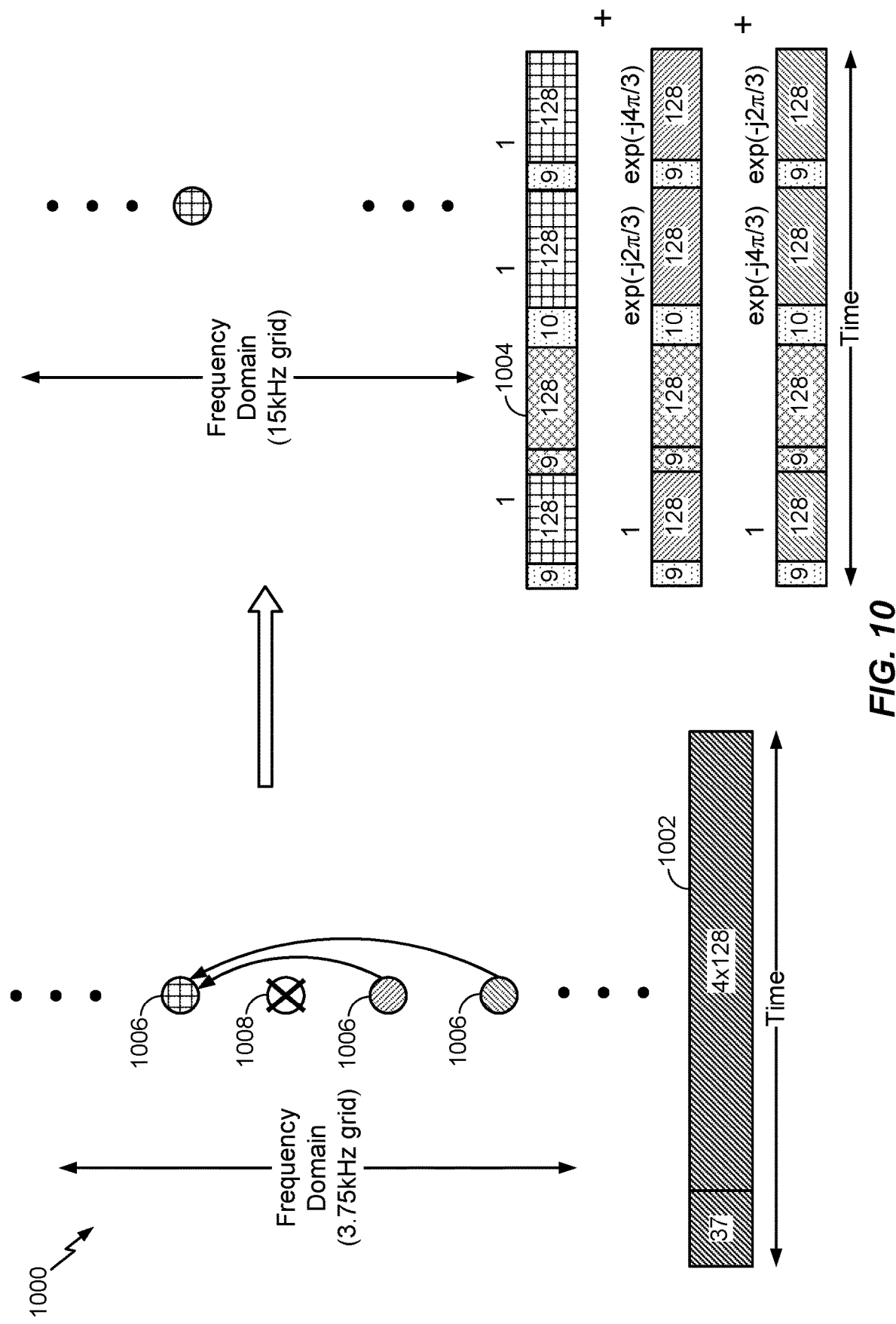
FIG. 10 illustrates an example multiplexed frame structure with SRS and CDM, according to aspects of the present disclosure.

FIG. 10 illustrates an example multiplexed frame structure 1000 with SRS and CDM, according to aspects of the present disclosure. For example, while all UEs may be silenced during the entirety of the 3.75 kHz symbol 1002 corresponding to the SRS transmission, UEs only need to be silenced for one symbol 1004 of four 15 kHz symbols corresponding to the SRS transmission. For the remaining three 15 kHz symbols, three (out of the four) UEs 1006 may transmit using CDM over time, through, for example, a DFT spreading code, to multiplex the three UEs. The fourth UE 1008 may be silenced.

Figure 11:
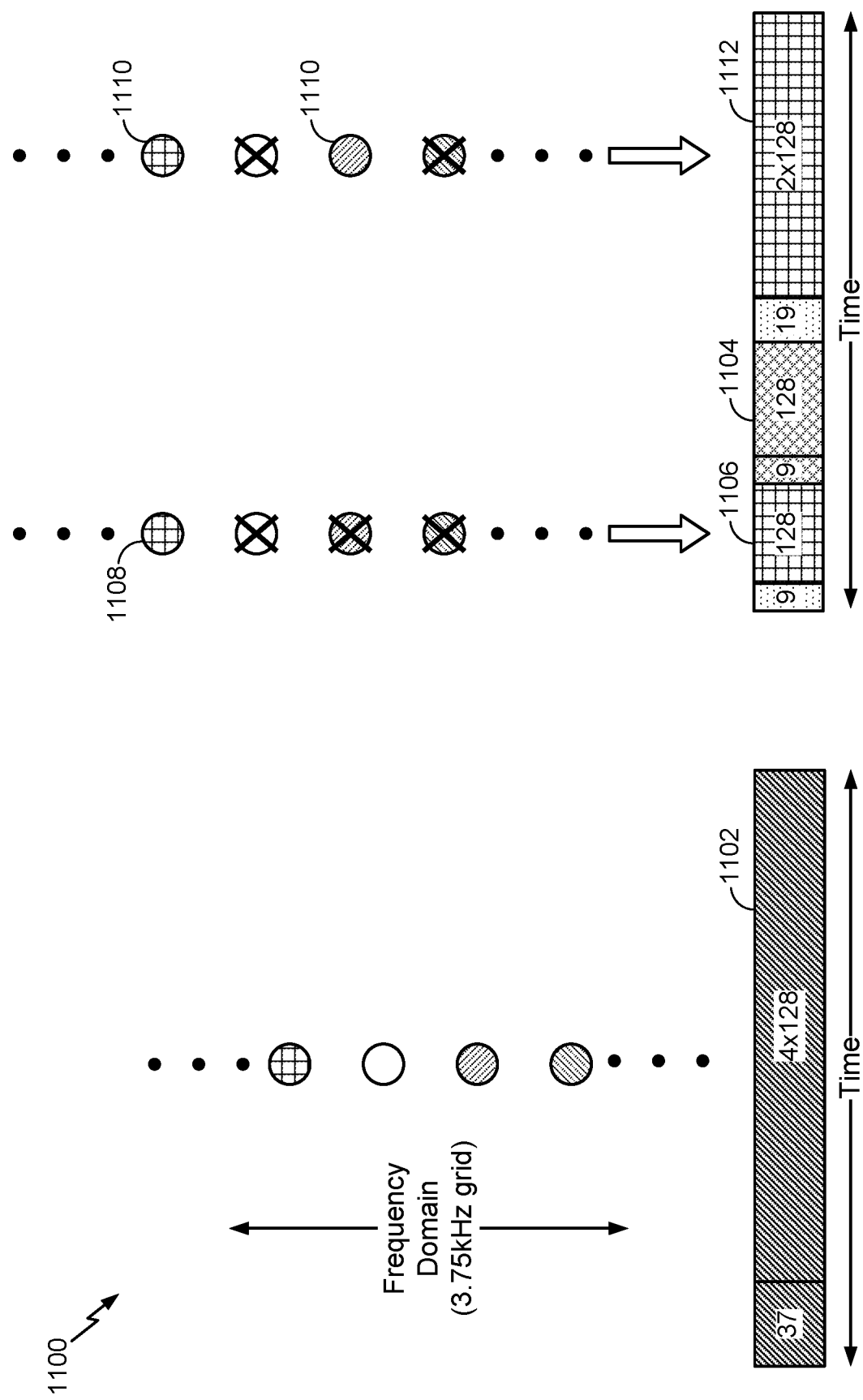
FIG. 11 illustrates example multiplexed frame structures with SRS, according to aspects of the present disclosure.

FIG. 11 illustrates example multiplexed frame structures 1100 with SRS, according to aspects of the present disclosure. Multiplexing UEs while switching to a 15 kHz grid from a 3.75 kHz grid may also be performed without CDM. In this example, as before, four UEs may be silenced during the entirety of a 3.75 kHz symbol 1102. UEs only need to be silenced for one symbol 1104 of four 15 kHz symbols corresponding to the SRS transmission. During one symbol 1106 of the four 15 kHz symbols, a first UE 1108 may transmit, while the other three UEs are silenced. Two UEs 1110 of the four UEs may then transmit in remaining OFDM symbol time 1112, in a manner similar to a frame structure with a 7.5 kHz tone spacing with a 2× expansion in duration, while the other two UEs are silenced. The CP and data durations are twice that of 15 kHz.

According to aspects of the present disclosure, NB-IoT transmissions may be configured in RBs at the edge of a wider system bandwidth and SRS configured to avoid the RBs used by NB-IoT. According to another aspect, a SRS may also be scheduled in subframes that are not NB-IoT subframes, such that the subframes assigned to NB-IoT would not be subject to SRS. According to another aspect, a SRS may be transmitted in conjunction with NB-IoT transmissions utilizing a 3.75 kHz tone spacing. In such cases, interference between the SRS transmission and the NB-IoT transmissions would occur and an eNB receiver may be allowed to handle the interference via existing techniques, for example interference cancellation, at the receiver.

According to aspects of the present disclosure, a comb pattern may also be used for multiplexing NB-IoT transmissions with SRS. Generally for a SRS transmission, half of the tones are actually used at a time for SRS transmission in a comb pattern. Those tones actually in use may be vacated. The other half not currently in use by the SRS transmission may be used for NB-IoT transmissions without interference with the SRS transmission. The pattern for the tones to be used for SRS may be signaled, for example, to a UE within an UL or DL grant, or configured semi-statically. Where a tone scheduled for SRS transmission is needed for the data transmission, a UE may need to perform rate matching around the SRS OFDM symbol. This comb pattern technique may be combined with the techniques discussed, for example, in conjunction with FIGS. 10 and 11.

According to aspects of the present disclosure, all TDD configurations may be covered using a 7.5 kHz tone spacing. With 7.5 kHz tone spacing, the CP and data durations are extended in the time domain by a factor of two with a 1 ms slot and 2 ms subframe duration. To fit within the 1 ms slot duration, per-slot transmission is needed such that if only 1 UL subframe is available, an eNB may grant a 1 NB slot so that the UE is aligned with a legacy UE.

According to aspects of the present disclosure, all TDD configurations may also be covered using a 3 kHz tone spacing. With 3 kHz tone spacing, the CP and data durations are extended in the time domain by a factor of five. However, with a 3 kHz tone spacing, the FFT size no longer is log 2, and some CPs may be extended to fit within a 1 ms slot duration.

According to aspects of the present disclosure, all TDD configurations may be supported by only using a 15 kHz tone spacing for in-band configurations. As indicated above, CDM in the time domain may be used to increase capacity as 15 kHz has less capacity as compared to lower frequency tone spacing configurations. For example, a CDM of length four may be allowed such that Walsh or DFT spreading is applied over four slots with a coherence requirement of 2 ms. As another example, CDM may be performed across four different OFDM symbols such that the DMRS symbols are repeated four times. However, this may result in weak channel estimation for OFDM data symbols that are more distant from DMRS repetitions.

Figure 12:
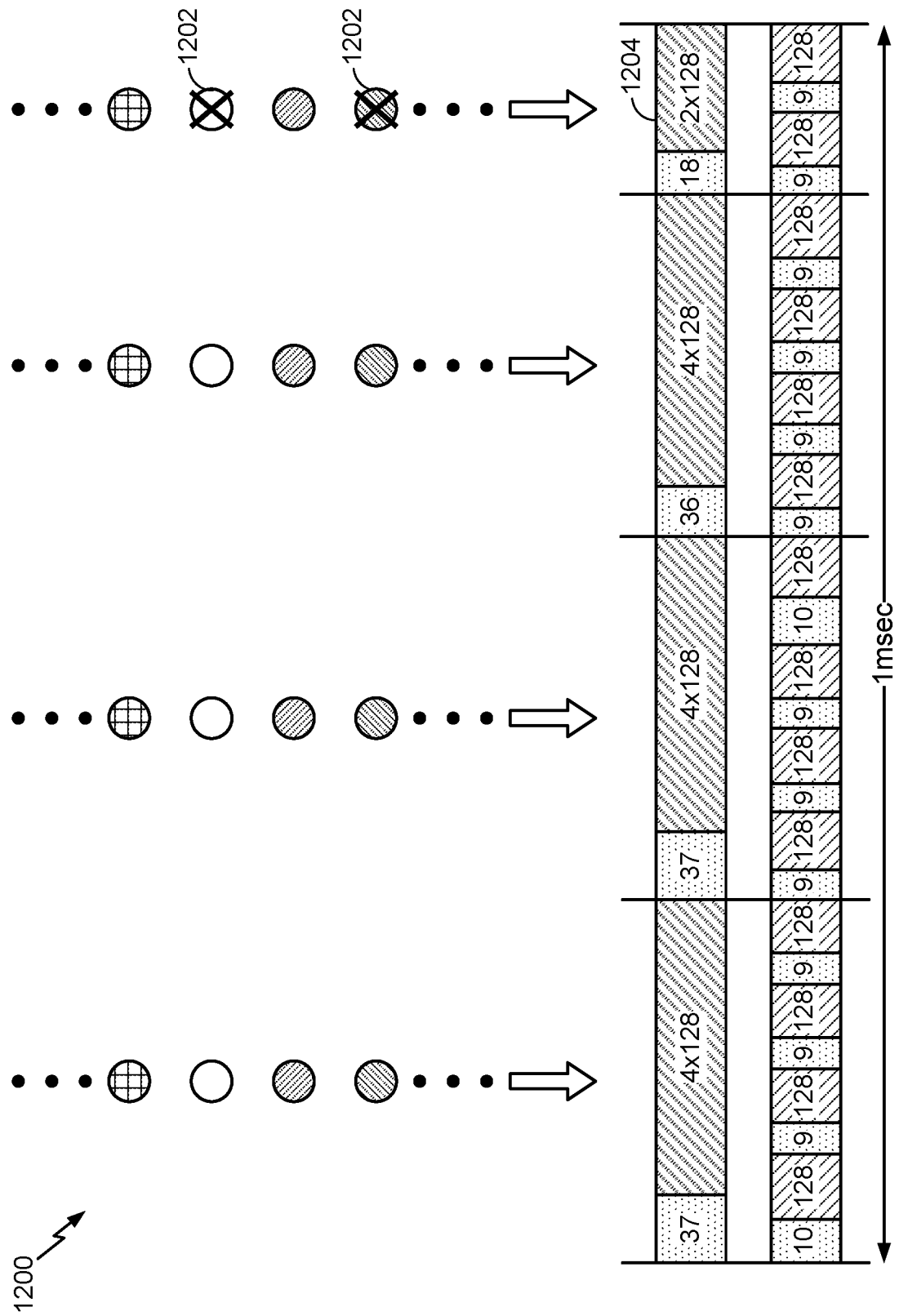
FIG. 12 illustrates an example multiplexed frame structure, according to aspects of the present disclosure.
Figure 13A:
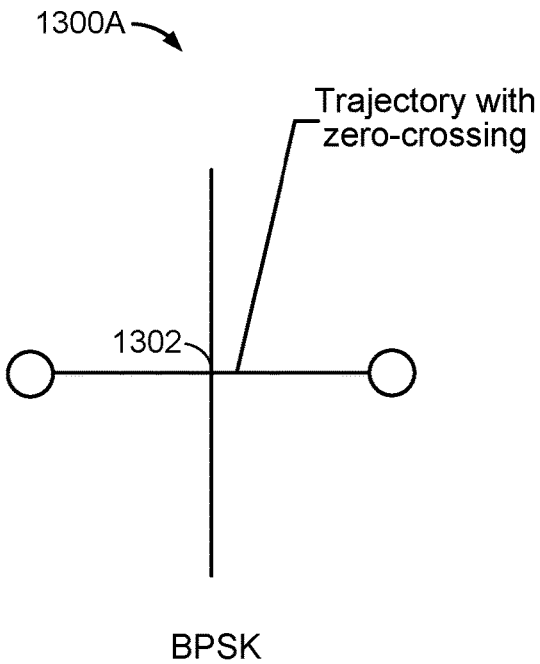
FIGS. 13A-D illustrate constellation diagrams of different modulations, according to aspects of the present disclosure.
Figure 13B:
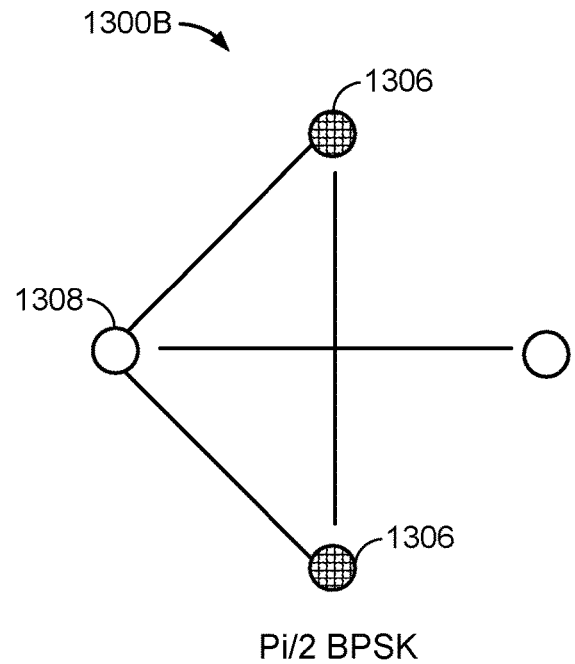
Figure 13C:
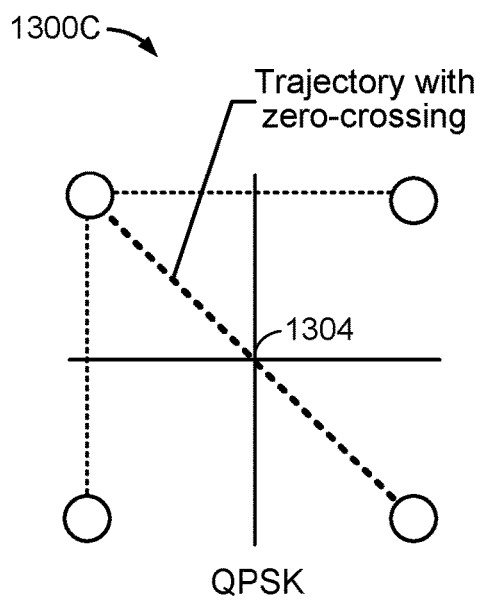
Figure 13D:
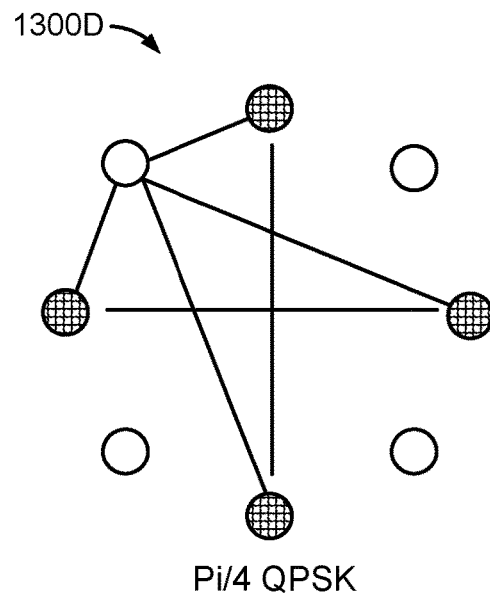

According to aspects of the present disclosure, all TDD configurations may be supported in conjunction with 3.75 kHz tone spacing. FIG. 12 illustrates an example multiplexed frame structure 1200, according to aspects of the present disclosure. After three 3.75 kHz OFDM symbols, two UEs 1202 out of the four multiplexed UEs may be silenced. The other two UEs may transmit on the remaining OFDM symbol 1204 such that the tonal spacing between the transmitting UEs is 7.5 kHz.

According to aspects of the present disclosure, multi-tone assignments may be made based on a comb pattern. For example, within a RB, certain tones, such as tones #1, 4, 8, and 12, may be assigned to a first UE, tones #3, 6, and 9, assigned to a second UE, and so forth. This allows for tones to span a wider bandwidth as compared to continuous tone assignments and better time tracking due to improved resolution.

According to aspects of the present disclosure, a computer generated sequence (CGS) design may be used for multi-tone allocations. LTE CGS may be used as a baseline with a corresponding QPSK (quadrature phase shift keying) sequence and updating tables based on the sequence length and extensive cross-correlation interference analysis. The cross-correlation interference analysis may consider all interfering UEs with all the possible number of tones that may be received from a neighboring cell.

FIGS. 13A-13D of FIG. 13 shows constellation diagrams 1300A-D of BPSK and QPSK modulations, according to aspects of the present disclosure. According to aspects of the present disclosure, pi/2-BPSK (binary phase shift keying) 1300B or pi/4-QPSK (quadrature phase shift keying) 1300D modulations may be used for data transmission over an uplink channel. Phase shift keying (PSK) is a modulation scheme for a reference signal (e.g., carrier wave) which encodes data by modulating the phase of the reference signal. BPSK 1300A is a form of PSK using two phases (e.g., offset) separated by 180 degrees and QPSK 1300C uses four phases separated by 90 degrees. As a PSK signal transitions from one constellation point to another constellation point, the signal may transition through a zero-point (1302 for BPSK and 1304 for QPSK) of the respective axis and increasing peak-to-average power ratio (PAPR). A phase shift in different time instants may be used to avoid zero-crossings in the transmitted waveform (e.g., waveform trajectories that go through the origin) and reduce the PAPR. For example, in the case of pi/2-BPSK (1300B) a phase shift of pi/2 (1306) may be applied in odd transmission instances, and a phase shift of 0 (1308) may be applied in even transmission instances. In some cases, the phase shift can be determined based on cell ID, UE ID, timing difference with respect to slot/subframe boundary, and/or timing difference with respect to hopping instants to reduce inter-cell and inter-UE interference. For example, in the case of pi/2-BPSK (1300B) a phase shift of pi/2 (1306) may be applied in odd transmission instances if the cell ID is odd, and a phase shift of 0 (1308) may be applied in even transmission instances if the cell ID is even.

A counter may be utilized to track phase shifts in different time instants. This counter may be restarted when certain boundaries are reached. For example, the counter may be restarted at the subframe boundary. In such cases, the effective result is that the counter is never restarted as the number of symbols in a subframe is even. According to other aspects, the counter may be restarted after every slot or after frequency hopping is performed.

Figure 14:
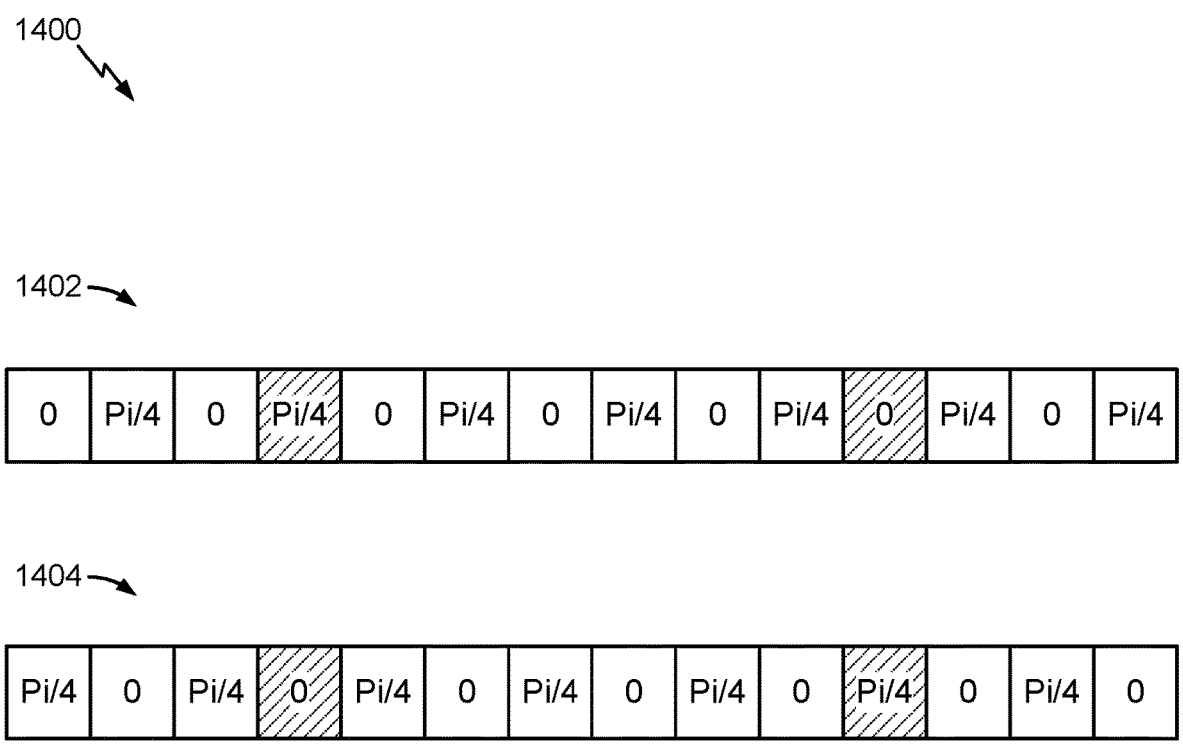
FIG. 14 illustrates example starting constellation rotations, according to aspects of the present disclosure.
Figure 15A:
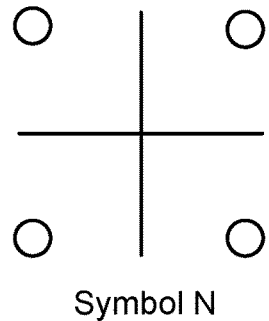
FIGS. 15A-D illustrate example constructions of a pilot sequence based on pilot modulation, according to aspects of the present disclosure.
Figure 15A:
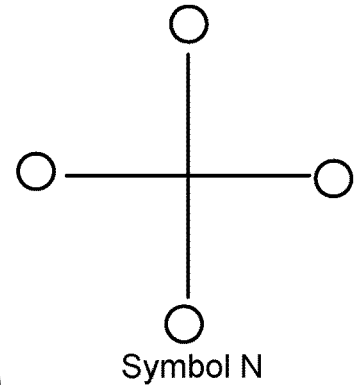
Figure 15B:
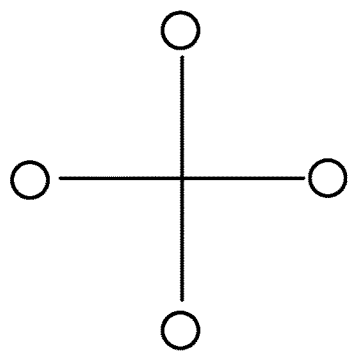
Figure 15B:
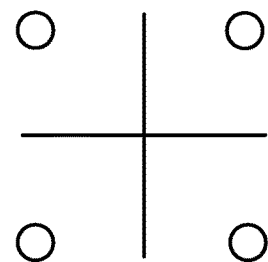
Figure 15C:
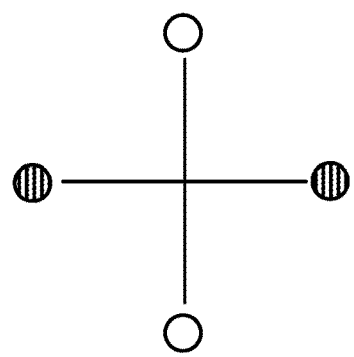
Figure 15C:
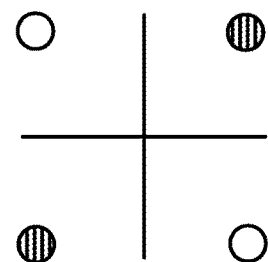
Figure 15D:
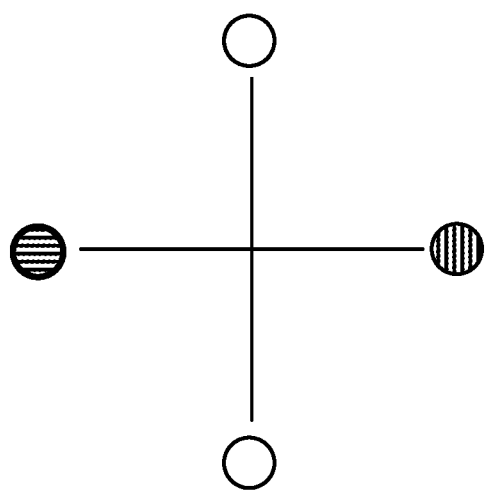
Figure 15D:
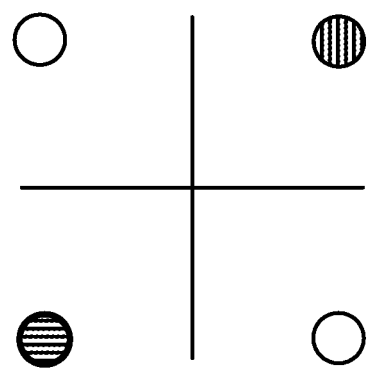

According to aspects of the present disclosure, inter-cell randomization may be further increased by adjusting starting constellation rotations 1400 to be different for UEs in different cells as illustrated in FIG. 14. For example, a first user 1402 in a first cell using pi/4 QPSK modulation may utilize a starting constellation rotation of pi/4, while a second user 1404 in a second cell also using pi/4 QPSK may utilize a starting constellation rotation of 0. This starting rotation may be explicitly signaled in a grant, for example with the DMRS cyclic shift). In other cases, this starting rotation may be implicitly signaled, for example based on a cell ID or RNTI value. Where modulations are mixed with BPSK and pi/4 QPSK, offsets may be different between BPSK and pi/4 QPSK users.

A longer duration DMRS sequence may be defined. According to certain aspects, a 40 ms DMRS sequence may be defined with sequence lengths of 20 sequences. The UE may, after reception of a DMRS sequence, transmit the corresponding DMRS sequence based on the absolute timing. For example, where a UE transmits from SF0 to SF9 using the first ten symbols, a UE transmitting in SF 10 to SF19 uses the next ten symbols.

Using pi/2-BPSK or pi/4-QPSK may require changing the manner in which uplink pilots are inserted in an uplink channel and using BPSK as the pilot sequence may reduce inter-cell interference mitigation and offer less degrees of freedom than QPSK based pilot sequences. According to aspects of the present disclosure, QPSK or pi/4-QPSK may be used as uplink pilots so that different users can use sequences with good cross-correlation properties regardless of data being transmitted using, for example, pi/2-BPSK or pi/4-QPSK. Using a common modulation for the pilot sequence, such as QPSK or pi/4-QPSK, may increase the PAPR of some users (e.g., users using pi/2-BPSK with pi/4-BPSK pilots). As another example, BPSK, pi/2-BPSK or pi/4-BPSK may be used as uplink pilots regardless of the modulation used for data. In yet another example, the pilot modulation may be determined based on the modulation used for data. For example, the same modulation may be used for both data and pilots. The latter approach helps address inter-cell interference for the higher modulation cases, such as QPSK cases, while reducing the peak-to-average ratio of BPSK users.

Where pilots use different modulations for QPSK and BPSK, the resulting sequences should have good cross-correlation sequences. For example, a CGS may be defined for QPSK and BPSK, for example with two separate tables, and the UE may determine which table to use based on the modulation scheme and an index in the table based on the cell ID, slot index, or other characteristics. In case the modulation to be used for pilots is the same as the modulation used for data, the exact sequence to be used may be determined based on a plurality of factors. For example, a set of pilot sequences may be defined in the specification, and the UE would select the pilot sequence based on the modulation used for data. The set of pilot sequences may be different for different cells, such that inter-cell interference can be reduced. Further, a pilot sequence may be defined for a long transmission interval, and the UE will select the corresponding sub-sequence based on absolute timing. For example, if a sequence is defined with a length of 40 ms, a first UE transmitting in 0-20 ms will use the first half of the sequence, and a second UE transmitting in 20 ms-40 ms will use the second half of the sequence.

Figure 17:
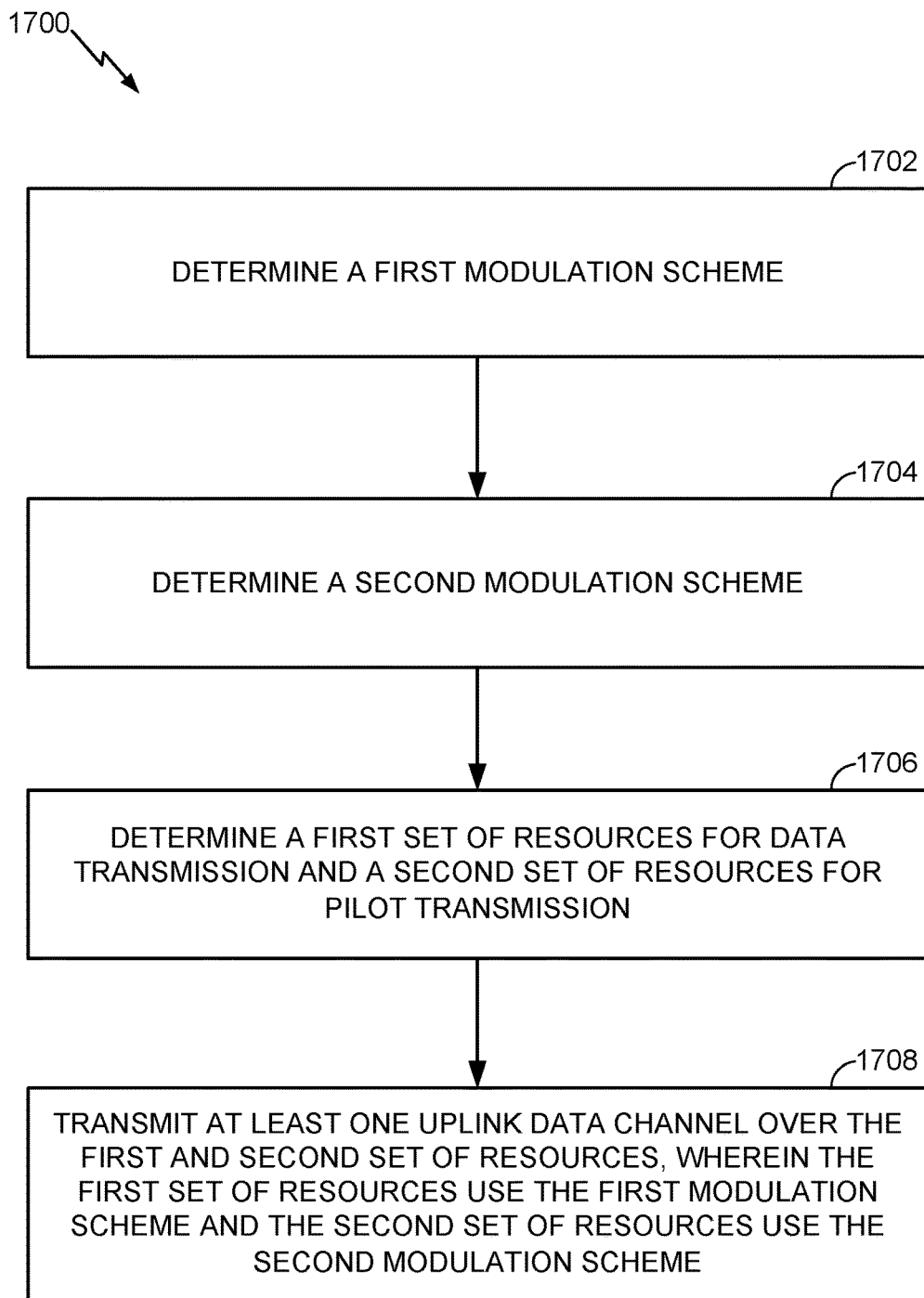
FIG. 17 illustrates an example operations that may be performed by a user equipment (UE), in accordance with aspects of the present disclosure.

FIG. 17 illustrates an example operations 1700 that may be performed by a user equipment (UE), in accordance with aspects of the present disclosure. In some cases, example operations 1700 may be performed by the UE for determining a modulation scheme for uplink pilots and determining a modulation scheme for data, as described above.

At 1702, the UE determines a first modulation scheme. At 1704, the UE determines a second modulation scheme. At 1706, the UE determines a first set of resources for data transmission and a second set of resources for pilot transmission. At 1708, the UE transmits at least one uplink data channel over the first and second set of resources, wherein the first set of resources use the first modulation scheme and the second set of resources use the second modulation scheme.

In some cases, the modulation used for pilots may be the same as the modulation used for data, but different modulations may use the same set of sequences to construct the pilots. The construction of the pilot sequence (e.g., DMRS) may include selecting a subset of the modulation points (e.g., keep only two modulation points) between applying a sequence from the set of sequences. For example, DMRS may be generated from a binary sequence that has good cross-correlation properties, such as a Walsh code. The same set of binary sequences (e.g., a sequence of "0" and "1" or "1" and "−1") may be used to generate the pilots regardless of the modulation used, e.g., for either pi/4-QPSK and pi/2-BPSK. For example, each sequence may be used to select between two modulation symbols for the case of pi/2-BPSK.

FIGS. 15A-D illustrate example constructions 1500A-1500D of a pilot sequence based on pilot modulation, according to aspects of the present disclosure. For example, where the modulation is pi/4-QPSK, then further steps may be taken. Calculation of the pilot sequences may be calculated by first applying a rotation (1500B) to pi/4 QPSK (1500A) following the same pattern as for the data symbol. A down selection may be performed (1500C) where only two out of the four QPSK points are selected to construct a pi/4 BPSK. This down-selection may be performed in such a way that the remaining two QPSK constellation points are antipodal (e.g., they are of the form [−x,x], with "x" a complex number). In some cases, the down-selection may be performed in such a way that the remaining constellation points are aligned with the constellation points of another modulation (e.g., with Pi/2 BPSK) (1500D). The down selection may be performed based on cell ID, UE ID, subframe/symbol/slot number, higher layer parameters (e.g., signaled in SIB or RRC), cyclic shift, repetition level, definition in a specification and/or other parameters. This alignment between different modulation types provides better properties in terms of cross-correlation. In some cases, the rotation of pi/4-BPSK and pi/2-QPSK may be defined in a continuous manner, e.g., the rotations are performed as exp(j*pi/4*n) or exp(j*pi/2*n), resulting in a complete rotation of the QPSK/BPSK symbols (for example, for n=2 the QPSK constellation is rotated 90 degrees, which is another QPSK but with a different bit mapping). If this continuous rotation is defined, then the mapping of the binary sequence to constellation points may need to take into account this rotation to preserve good correlation properties.

Figure 16A:
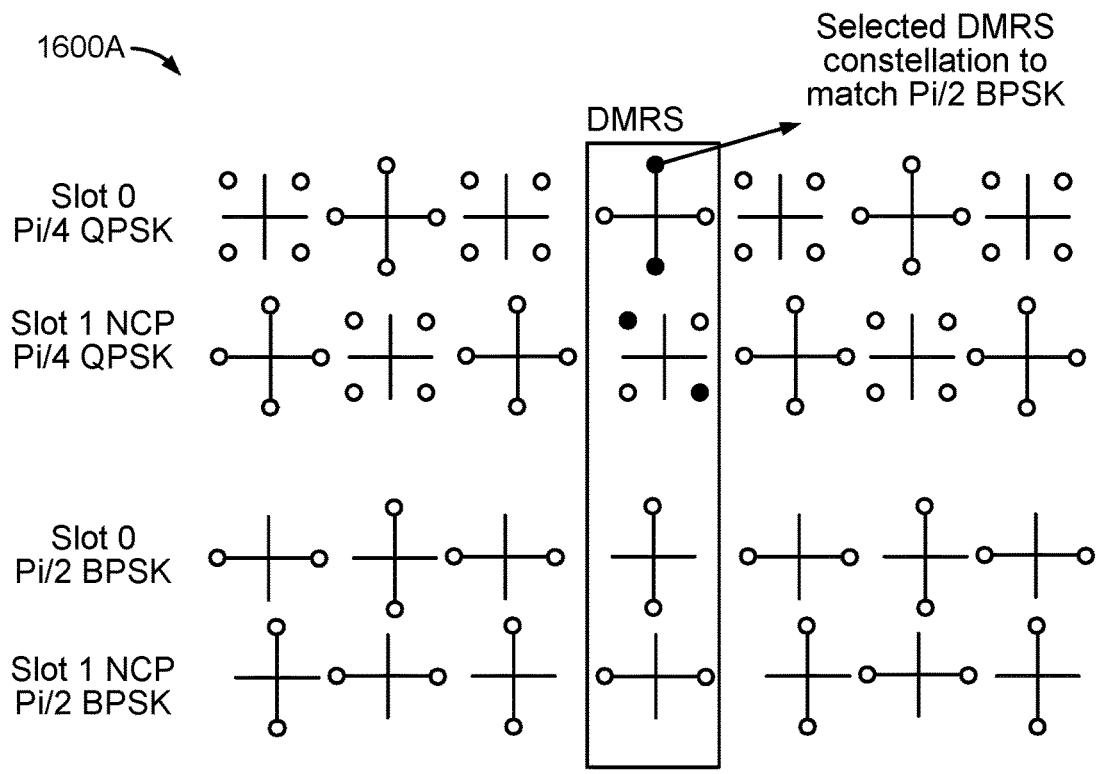
FIGS. 16A-C illustrate aligned constellation points, according to aspects of the present disclosure.
Figure 16B:
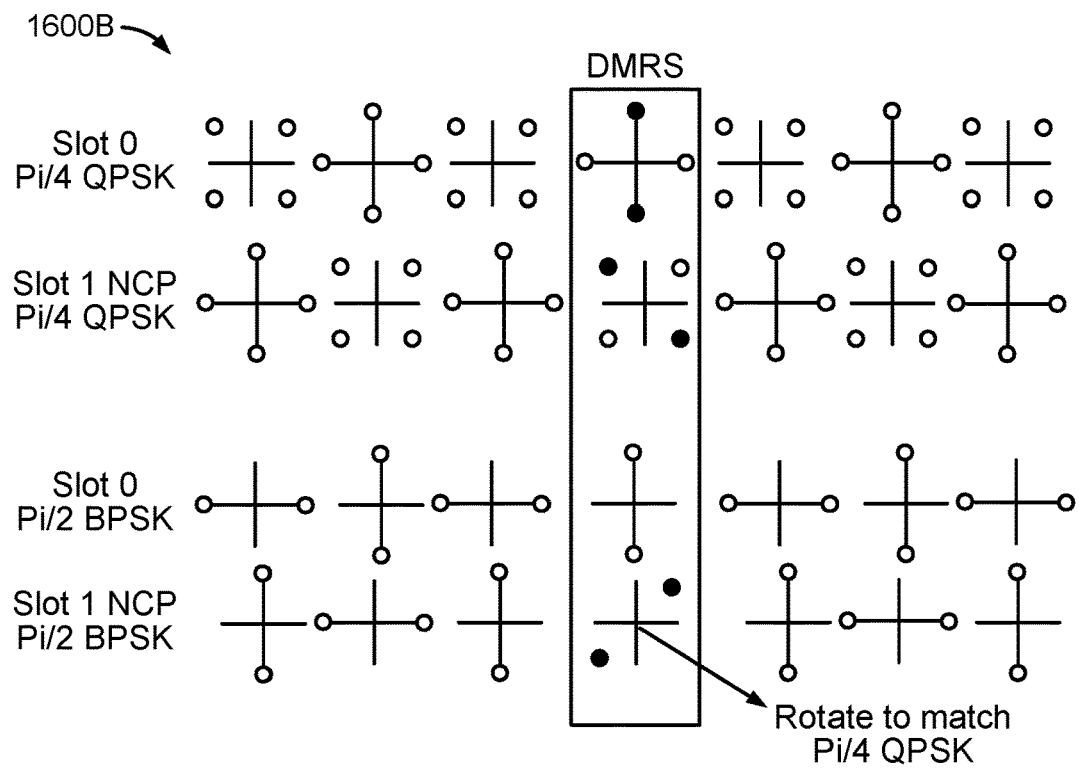
Figure 16C:
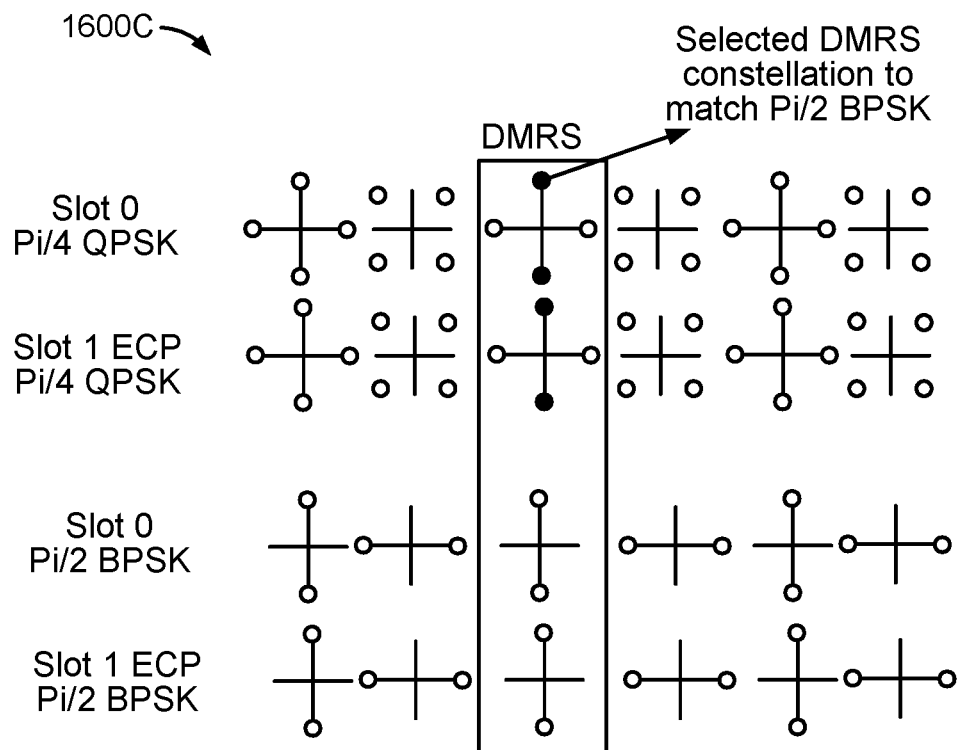

FIGS. 16A-C illustrate aligned constellation points 1600A-C, according to aspects of the present disclosure. In some cases, the modulation used for pilots may be selected to be aligned between different modulations. For example, for pi/2-BPSK transmission, in some symbols the constellation points may be aligned with a subset of pi/4-QPSK transmissions (1600A and 1600B for normal CP (NCP) lengths and 1600C for extended CP (ECP) lengths). In such a case, the modulation used for pilot transmission is pi/2-BPSK or a subset of pi/4-QPSK (e.g., they are equivalent), for example. For some rotation values and in some symbols, the pi/4-QPSK may not be aligned with pi/2-BPSK. In such a case, the pi/2-BPSK user may use pi/4-QPSK as a pilot sequence, and may include a down selection process.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may be performed by any suitable corresponding counterpart means-plus-function components.

For example, means for determining, means for selecting, means for performing, means for monitoring, and/or means for attempting may include one or more processors (or a processing system), such as controller/processor 240, scheduler 246, transmitter processor 220, receive processor 238, MIMO detector 236, TX MIMO processor 230, and/or modulator(s)/demodulator(s) 232a-232t of the base station 110 illustrates in FIG. 2, and/or controller/processor 280, receive processor 258, transmit processor 264, MIMO detector 256, TX MIMO processor 266, and/or modulator(s)/demodulator(s) 254a-254r of the user equipment 120 illustrated in FIG. 2. Means for transmitting, may include a transmitter, such as transmit processor 220, TX MIMO processor 230, modulator(s) 232a-232t, and/or antenna(s) 234a-234t of the base station 110 illustrated in FIG. 2, and/or transmit processor 264, TX MIMO processor 266, modulator(s) 254a-254r, and/or antenna(s) 252a-252r of the user equipment 120 illustrated in FIG. 2. Means for receiving and/or means for obtaining may include a receiver, such as receive processor 238, MIMO detector 236, demodulator(s) 232a-232t, and/or antenna(s) 234a-234t of the base station 110 illustrated in FIG. 2 and/or MIMO detector 256, receive processor 258, demodulator(s) 254a-254r, and/or antenna(s) 252a-252r of the user equipment 120 illustrated in FIG. 2.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, flash memory, phase change memory, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC ("ABC" indicating A and B and C), as well as any combination with multiples of the same element (e.g., AA, AAA, ABB, AAC, ABBCC or any other ordering of A, B, C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE) comprising:
   determining a first set of resources for transmission of data using a first modulation scheme;
   determining a second set of resources for transmission of at least one pilot using a second modulation scheme;
   determining a phase offset to be applied to at least one of the first modulation scheme or the second modulation scheme based at least on at least one of a cell ID, a timing with respect to a slot boundary, a timing with respect to a subframe boundary, an absolute timing, or a timing with respect to hopping instances;
   transmitting the data over the first set of resources using the first modulation scheme; and
   transmitting the at least one pilot over the second set of resources using the second modulation scheme.

2. The method of claim 1, wherein the first modulation scheme comprises pi/4 QPSK or pi/2 BPSK and the second modulation scheme comprises pi/4 QPSK or pi/2 BPSK.

3. The method of claim 1, wherein:
   determining the first modulation scheme comprises receiving a downlink grant containing the first modulation scheme; and
   the second modulation scheme is determined based on the first modulation scheme.

4. The method of claim 3, wherein:
   the first and second modulation schemes are the same.

5. The method of claim 1, further comprising determining a sequence to be transmitted over the second set of resources using the second modulation scheme based at least on at least one of the following:
   the cell ID, the absolute timing, a UE ID, a modulation type, or an indication in downlink grant.

6. A method for wireless communication by a user equipment (UE), comprising:
   determining a first set of resources for transmission of data using a first modulation scheme;
   determining a second set of resources for transmission of at least one pilot using a second modulation scheme;
   determining a sequence for the at least one pilot;
   selecting a set of constellation points in the second modulation scheme; and
   transmitting the data over the first set of resources using the first modulation scheme; and
   transmitting the at least one pilot over the second set of resources using the second modulation scheme based at least in part on the sequence and the set of the constellation points.

7. The method of claim 6, wherein the selecting a set of the constellation points is performed based on at least one of:
   a cell ID, a timing with respect to slot boundary, a timing with respect to subframe boundary, an absolute timing, a timing with respect to hopping instances, a rotation applied to a different constellation, a cyclic prefix length, a UE ID, a cyclic shift, or a repetition level.

8. The method of claim 6, wherein:
   the selecting the set of the constellation points comprises selecting two constellation points regardless of the first or second modulation scheme; and
   the determining the sequence is performed independently of the determining the first or second modulation scheme.

9. The method of claim 6, wherein the sequence is determined based on at least one of:
   a cell ID, a timing with respect to slot boundary, a timing with respect to subframe boundary, an absolute timing, a timing with respect to hopping instances, a rotation applied to a different constellation, a cyclic prefix length, a UE ID, a cyclic shift, or a repetition level.

10. An apparatus for wireless communications, comprising:
    at least one processor; and
    memory coupled with the at least one processor, the memory storing instructions for the at least one processor to cause the apparatus to:
       determine a first set of resources for transmission of data using a first modulation scheme;
       determine a second set of resources for transmission of at least one pilot using a second modulation scheme;
       determine a phase offset to be applied to at least one of the first modulation scheme or the second modulation scheme based at least on at least one of a cell ID, a timing with respect to a slot boundary, a timing with respect to a subframe boundary, an absolute timing, or a timing with respect to hopping instances;
       transmit the data over the first set of resources using the first modulation scheme; and
       transmit the at least one pilot over the second set of resources using the second modulation scheme.

11. The apparatus of claim 10, wherein the first modulation scheme comprises pi/4 QPSK or pi/2 BPSK and the second modulation scheme comprises pi/4 QPSK or pi/2 BPSK.

12. The apparatus of claim 10, wherein:
    the instructions for the at least one processor to cause the apparatus to determine the the first modulation scheme comprise instructions for the at least one processor to cause the apparatus to receive a downlink grant containing the first modulation scheme; and
    the memory further stores instructions for the at least one processor to cause the apparatus to determine the second modulation scheme based on the first modulation scheme.

13. The apparatus of claim 12, wherein:
    the first and second modulation schemes are the same.

14. The apparatus of claim 10, wherein the memory further stores instructions for the at least one processor to cause the apparatus to determine a sequence to be transmitted over the second set of resources using the second modulation scheme based at least on at least one of the following:
    the cell ID, the absolute timing, a UE ID, a modulation type, or an indication in downlink grant.

15. An apparatus for wireless communications, comprising:
    at least one processor; and
    memory coupled with the at least one processor, the memory storing instructions for the at least one processor to cause the apparatus to:
       determine a first set of resources for transmission of data using a first modulation scheme;
       determine a second set of resources for transmission of at least one pilot using a second modulation scheme;
       determine a sequence for the at least one pilot;
       select a set of constellation points in the second modulation scheme; and transmit the data over the first set of resources using the first modulation scheme; and transmit the at least one pilot over the second set of resources using the second modulation scheme based at least in part on the sequence and the set of the constellation points.

16. The apparatus of claim 15, wherein the memory further stores instructions for the at least one processor to cause the apparatus to select the set of the constellation points based on at least one of:

a cell ID, a timing with respect to slot boundary, a timing with respect to subframe boundary, an absolute timing, a timing with respect to hopping instances, a rotation applied to a different constellation, a cyclic prefix length, a UE ID, a cyclic shift, or a repetition level.

17. The apparatus of claim 15, wherein:

the instructions for the at least one processor to cause the apparatus to select the set of the constellation points comprise instructions for the at least one processor to cause the apparatus to select two constellation points regardless of the first or second modulation scheme; and the memory further stores instructions for the at least one processor to cause the apparatus to determine the sequence independently of the determining the first or second modulation scheme.

18. The apparatus of claim 15, wherein the memory further stores instructions for the at least one processor to cause the apparatus to determine the sequence based on at least one of:

a cell ID, a timing with respect to slot boundary, a timing with respect to subframe boundary, an absolute timing, a timing with respect to hopping instances, a rotation applied to a different constellation, a cyclic prefix length, a UE ID, a cyclic shift, or a repetition level.

* * * * *